(12) United States Patent
Kohama et al.

(10) Patent No.: US 10,275,977 B2
(45) Date of Patent: Apr. 30, 2019

(54) METHOD AND APPARATUS FOR SORTING RETURNED MEDICINE BASED ON SIZE

(71) Applicant: YUYAMA MFG. CO., LTD., Toyonaka-shi, Osaka (JP)

(72) Inventors: Akitomi Kohama, Toyonaka (JP); Yasuhiro Shigeyama, Toyonaka (JP); Hiromichi Tsuda, Toyonaka (JP); Takashi Ueno, Toyonaka (JP); Hidenori Tsuji, Toyonaka (JP); Mei Zhang, Toyonaka (JP)

(73) Assignee: YUYAMA MGF. CO., LTD., Osaka (JP)

( * ) Notice: Subject to any disclaimer, the term of this patent is extended or adjusted under 35 U.S.C. 154(b) by 137 days.

(21) Appl. No.: 15/310,067

(22) PCT Filed: May 8, 2015

(86) PCT No.: PCT/JP2015/063370
§ 371 (c)(1),
(2) Date: Nov. 9, 2016

(87) PCT Pub. No.: WO2015/170761
PCT Pub. Date: Nov. 12, 2015

(65) Prior Publication Data
US 2017/0140601 A1    May 18, 2017

(30) Foreign Application Priority Data

May 9, 2014 (JP) .................................. 2014-097933
Sep. 25, 2014 (JP) .................................. 2014-195845
Nov. 13, 2014 (JP) .................................. 2014-230991

(51) Int. Cl.
*G07F 11/60* (2006.01)
*G06T 7/70* (2017.01)
(Continued)

(52) U.S. Cl.
CPC ............ *G07F 11/60* (2013.01); *G06K 7/1413* (2013.01); *G06K 19/06028* (2013.01);
(Continued)

(58) Field of Classification Search
CPC ........... G07F 11/60; G06T 7/70; G06K 7/143; G06K 19/06028
See application file for complete search history.

(56) References Cited

U.S. PATENT DOCUMENTS 7,006,893 B2 * 2/2006 Hart ...................... G06F 19/324
700/235
7,080,755 B2 * 7/2006 Handfield ............. A61J 7/0084
221/13
(Continued)

FOREIGN PATENT DOCUMENTS

JP    H06-255726 A    9/1994
JP    H10-201824 A    8/1998
(Continued)

OTHER PUBLICATIONS

ISA/JP, International Search Report dated Jun. 23, 2015 in International Application No. PCT/JP2015/063370, total 5 pages with English translation.

*Primary Examiner* — Patrick H Mackey
(74) *Attorney, Agent, or Firm* — Masuvalley & Partners

(57) ABSTRACT

A medicine sorting apparatus includes a receiving part, an identifying part and a storing part. The storing part includes a plurality of storing trays arranged in multiple stages. A storing area for each of returned medicines is defined at the time of storing each of the returned medicines according to a size of each of the returned medicines identified by the identifying part. Each of the returned medicines is stored in the storing tray in a state that the storing area for each of the returned medicines is associated with identification infor-
(Continued)

mation of each of the returned medicines so that each of the returned medicines can be taken from the storing tray by a scalar type robot.

16 Claims, 20 Drawing Sheets

(51) Int. Cl.
- *G06K 7/14* (2006.01)
- *G06K 19/06* (2006.01)
- *G06Q 10/08* (2012.01)
- *G07F 17/00* (2006.01)
- *H04N 5/247* (2006.01)

(52) U.S. Cl.
CPC ............ *G06Q 10/087* (2013.01); *G06T 7/70* (2017.01); *G07F 17/0092* (2013.01); *H04N 5/247* (2013.01)

(56) References Cited

U.S. PATENT DOCUMENTS

| | | | |
|---|---|---|---|
| 8,234,838 B2 * | 8/2012 | Yasunaga | A61J 7/0084 221/123 |
| 8,925,434 B2 * | 1/2015 | Omura | A61J 7/0007 225/93 |
| 9,710,994 B2 * | 7/2017 | Omura | G07F 17/0092 |
| 9,731,853 B2 * | 8/2017 | Akdogan | B25J 9/1697 |
| 2006/0058724 A1 * | 3/2006 | Handfield | A61J 7/0084 604/20 |
| 2006/0124656 A1 * | 6/2006 | Popovich, Jr. | G07F 9/026 221/9 |
| 2006/0266763 A1 * | 11/2006 | Svabo Bech | G07F 11/16 221/83 |
| 2013/0125722 A1 * | 5/2013 | Omura | A61J 7/0007 83/104 |
| 2013/0325168 A1 | 12/2013 | Kim | |

FOREIGN PATENT DOCUMENTS

| | | | | |
|---|---|---|---|---|
| JP | H11-197213 A | | 7/1999 | |
| JP | 2001-198194 A | | 7/2001 | |
| JP | 2004-345837 A | | 12/2004 | |
| JP | 2005-237713 A | | 9/2005 | |
| JP | 2010201152 A | * | 9/2010 | ............ G06F 11/16 |
| JP | 2011-024663 A | | 2/2011 | |
| JP | 2013-215343 A | | 10/2013 | |
| JP | 2013215343 A | * | 10/2013 | |
| JP | 2015-051040 A | | 3/2015 | |

\* cited by examiner

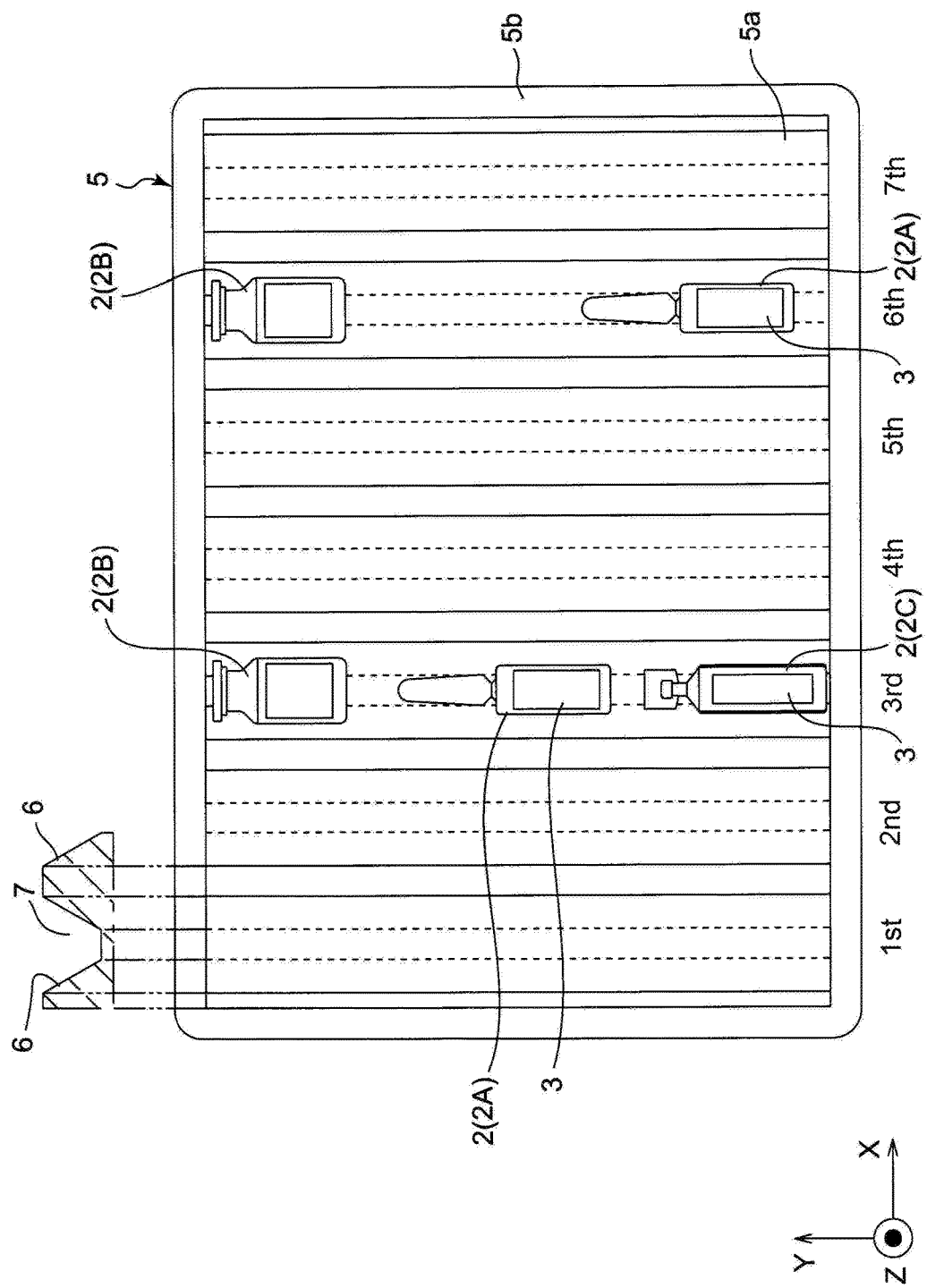

METHOD AND APPARATUS FOR SORTING RETURNED MEDICINE BASED ON SIZE

RELATED APPLICATIONS

This application is the U.S. National Phase of and claims priority to International Patent Application No. PCT/JP2015/063370, International Filing Date May 8, 2015, entitled Drug Assortment Device And Drug Assortment Method; which claims benefit of Japanese Application No. JP2014-097933 filed May 9, 2014; Japanese Application No. JP2014-195845 filed Sep. 25, 2014; Japanese Application No. JP2014-230991 filed Nov. 13, 2014; all of which are incorporated herein by reference in their entireties.

TECHNICAL FIELD

The present invention relates to a medicine sorting apparatus and a medicine sorting method.

BACKGROUND ART

There is a case where medicines prescribed to patients are returned to a department for managing medicine prescriptions in a medical institution because of some reasons such as change of prescription (hereinafter, this medicine returned to the medical institution is referred to as a returned medicine). Patent document 1: JP 2013-215343A discloses a returned medicine sorting apparatus for automatically identifying and storing the returned medicine in order to improve efficiency of an operation for treating the returned medicine and prevent human errors in this operation.

SUMMARY OF THE INVENTION

Generally, the returned medicines have different characteristics such as a type, a shape, a size and an expiration date. However, in a conventional returned medicine sorting apparatus such as the returned medicine sorting apparatus disclosed in the patent document 1, any special consideration, such as a consideration for ensuring a high degree of freedom related to factors such as efficiency of a subsequent operation for dispensing the returned medicines, is not given to an operation for storing the returned medicines having the different characteristics. More specifically, any special consideration for ensuring the high degree of freedom to allow the returned medicines to be freely dispensed according to information such as prescription information is not given to the operation for storing the returned medicines having the different characteristics.

An object of the present invention is to automatically identify medicines having different characteristics such as a type, a shape, a size and an expiration date and supplied in a non-aligned state and to store the medicines with ensuring a high degree of freedom.

A first aspect of the present invention provides a medicine sorting apparatus comprises an identifying part for identifying a direction, a posture and characteristics such as a shape, a size, a type and an expiration date of each of medicines; and a storing part for storing the medicines so that each of the medicines can be taken from the storing part by arranging each of the medicines in the storing part in a state that a storing area defined for each of the medicines at the time of storing each of the medicines according to at least the size of each of the medicines identified by the identifying part is associated with identification information of each of the medicines.

The identifying part identifies the direction, the posture and the characteristics (containing the type, the shape, the size, the expiration date and the like) of each of the medicines. Each of the medicines is arranged in the storing part in a state that the storing area defined for each of the medicines at the time of storing each of the medicines according to at least the size of each of the medicines identified by the identifying part is associated with the identification information of each of the medicines. Each of the medicines stored in the storing part can be taken from the storing part. Thus, it is possible to automatically identify the direction, the posture and the characteristics of each of the medicines and store each of the medicines with ensuring a high degree of freedom allowing the medicines to be freely dispensed according to prescription information or the like.

A second aspect of the present invention provides a medicine sorting method comprises identifying a direction, a posture and characteristics such as a shape, a size, a type and an expiration date of each of medicines with an identifying part; defining a storing area for each of the medicines in a storing part according to at least the size thereof identified by the identifying part; and arranging each of the medicines in a state that the storing area defined for each of the medicines in the storing part is associated with identification information of each of the medicines.

According to the medicine sorting apparatus and the medicine sorting method of the present invention, it is possible to automatically identify the direction, the posture and the characteristics such as the shape, the size, the type and the expiration date of each of the medicines and store each of the medicines with ensuring the high degree of freedom allowing the medicines to be freely dispensed according to the prescription information or the like.

BRIEF DESCRIPTION OF THE DRAWINGS

FIG. 20 is a schematic planar view of the storing tray.

Figure 1:
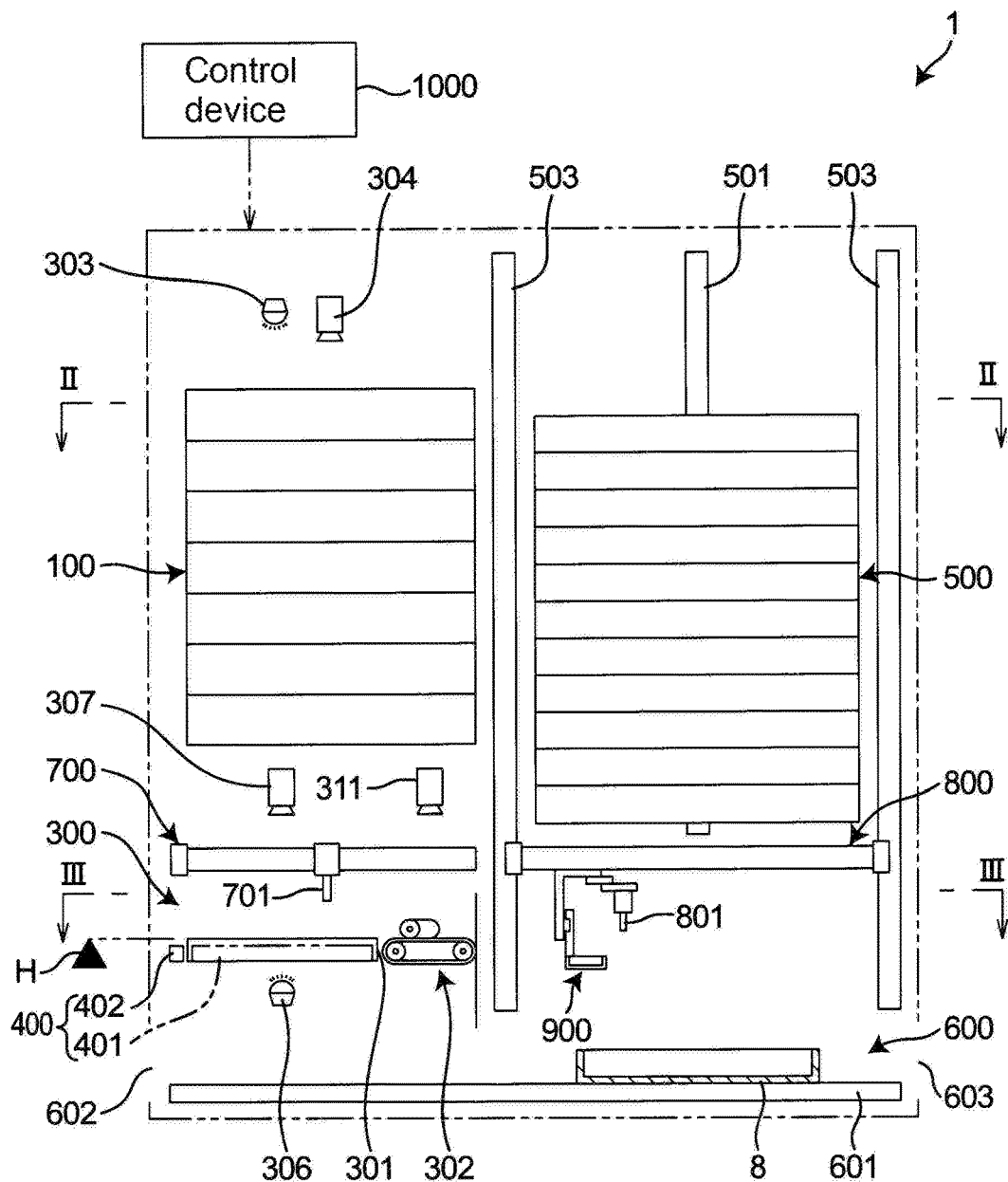
FIG. 1 is a schematic front view of a returned medicine dispensing apparatus according to an embodiment of the present invention.

DETAILED DESCRIPTION OF THE PREFERRED EMBODIMENTS (Summary of Apparatus)

Each of FIGS. 1 to 6 shows a returned medicine supplying apparatus (medicine sorting apparatus) 1 according to an embodiment of the present invention. The returned medicine supplying apparatus 1 includes a receiving part 100, an elevating part 200, an identifying part 300, a non-stored medicine arrangement part 400, a storing part 500 and a dispensing part 600. The returned medicine supplying apparatus 1 further includes an orthogonal type robot 700, a scalar type robot 800 and a support tray 900. Furthermore, the returned medicine supplying apparatus 1 includes a control device 1000 schematically shown in FIG. 1. The control device 1000 totally controls an operation of the returned medicine supplying apparatus 1 based on an input from a control panel 1001 (which includes a display 1002) illustrated in FIG. 4, an input from a sensor or a camera or the like.

Summary of a main function of the returned medicine supplying apparatus 1 is described as follows. The returned medicine supplying apparatus 1 identifies characteristics such as a shape, a size (a length L1 and a diameter or a width W1), a type and an expiration date of each of returned medicines 2 such as an ampule 2A, a vial 2B and a resin ampule 2C (see FIG. 8). In this embodiment, a label 3 on which a barcode or literal information containing information on the type, the expiration date and the like is printed adheres to each of the returned medicines 2. The returned medicine supplying apparatus 1 reads these information indicated on the label 3. Further, the returned medicine supplying apparatus 1 associates the identified returned medicine 2 with identification information of this returned medicine 2 (the identification information is unique information added to each of the returned medicines 2) to temporarily store the identified returned medicine 2 and dispense the identified returned medicine 2 based on prescription data (received from a host system (HIS: Hospital Information System) which is, for example, an electronic health record system). When the returned medicine 2 is stored, a storing area is defined according to the size of the returned medicine 2 to be stored. To store the returned medicine 2 is performed so that the returned medicine 2 is stored in the defined storing area and each of the returned medicines 2 can be taken from at the time of dispensing each of the returned medicines 2. Further, the returned medicine supplying apparatus 1 discharges one or more of the returned medicines 2 whose expiration dates have expired. Actually, words of "validated date" are often used instead of the words of "expiration date". However, these words are substantially synonymous. Thus, in this specification, the words of "validated date" are not used and only the words of "expiration date" are used in order to avoid confusion.

(Receiving Part)

Figure 2:
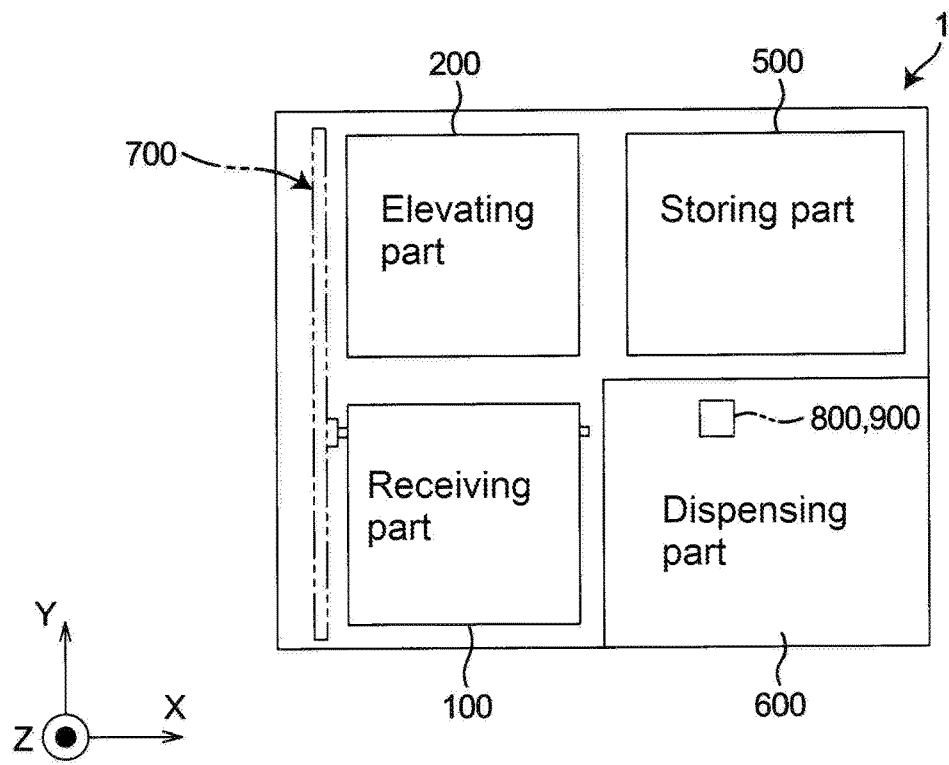
FIG. 2 is a schematic view showing a layout of the returned medicine dispensing apparatus taken from II-II line in FIG. 1.
Figure 3:
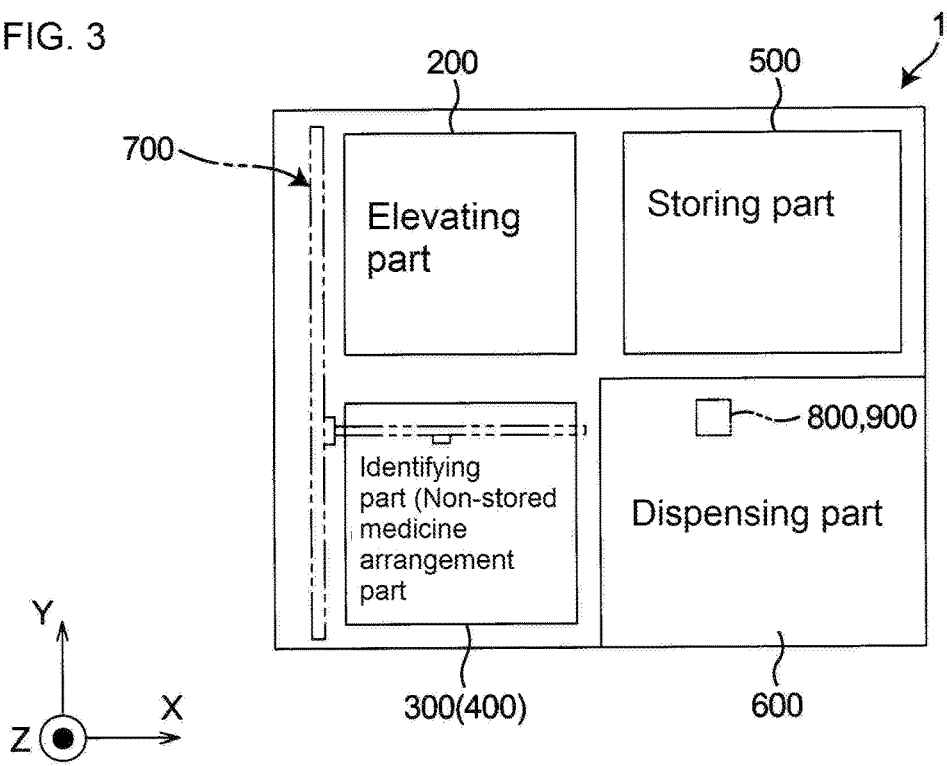
FIG. 3 is a schematic view showing the layout of the returned medicine dispensing apparatus taken from line in FIG. 1.
Figure 4:
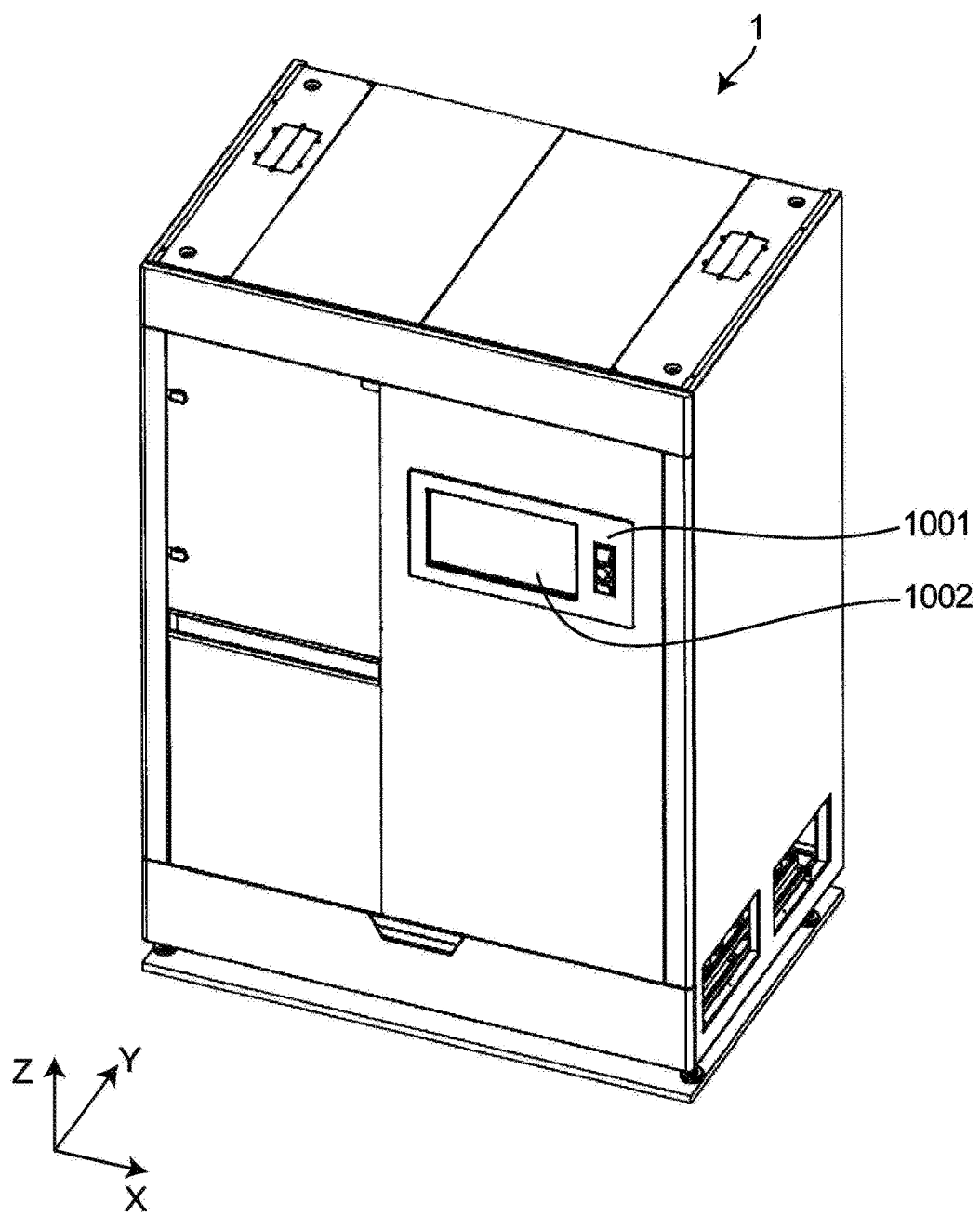
FIG. 4 is a perspective view showing an external view of the returned medicine dispensing apparatus according to the embodiment of the present invention.
Figure 5:
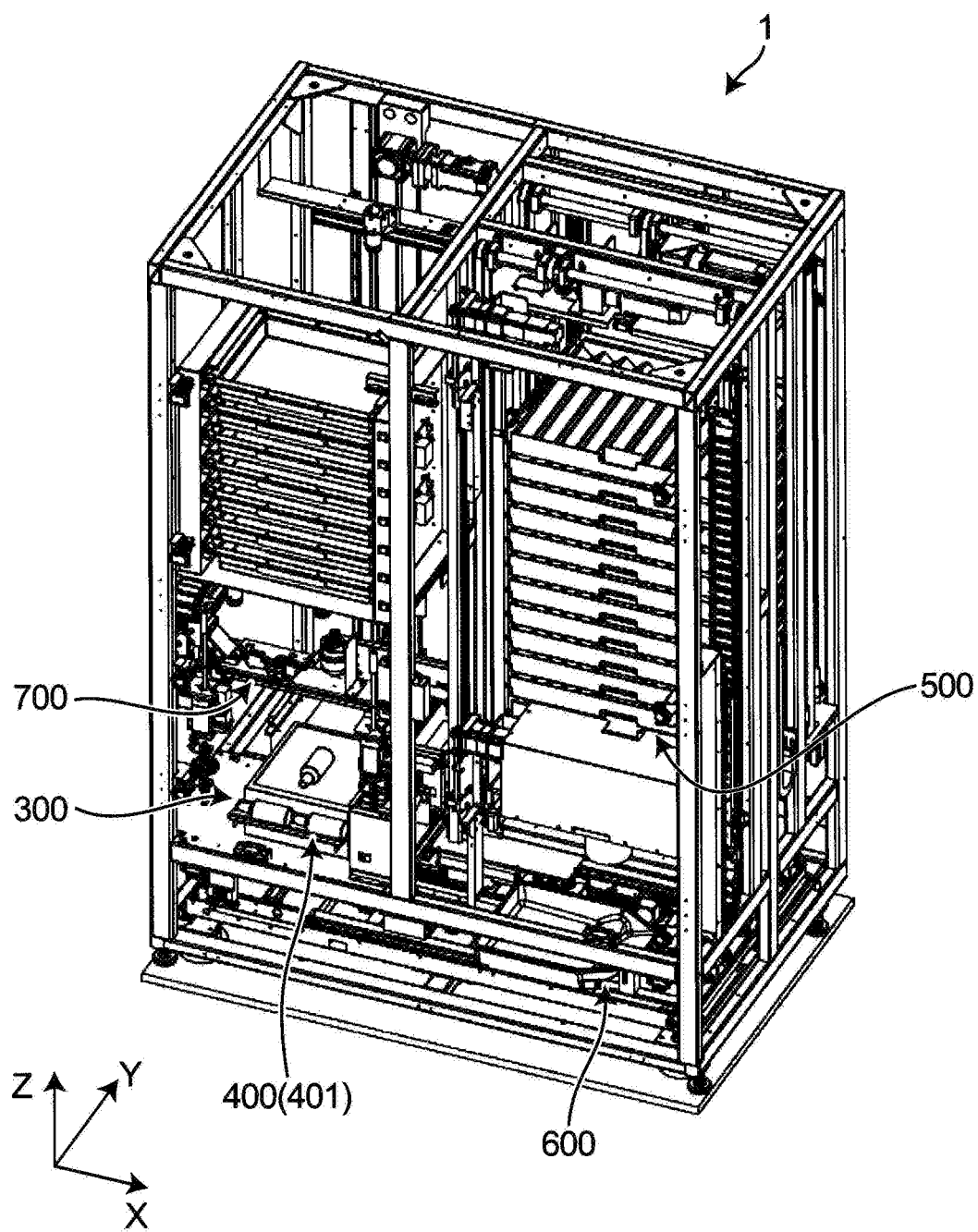
FIG. 5 is a perspective view of the returned medicine dispensing apparatus in a state that an external panel is removed.
Figure 6:
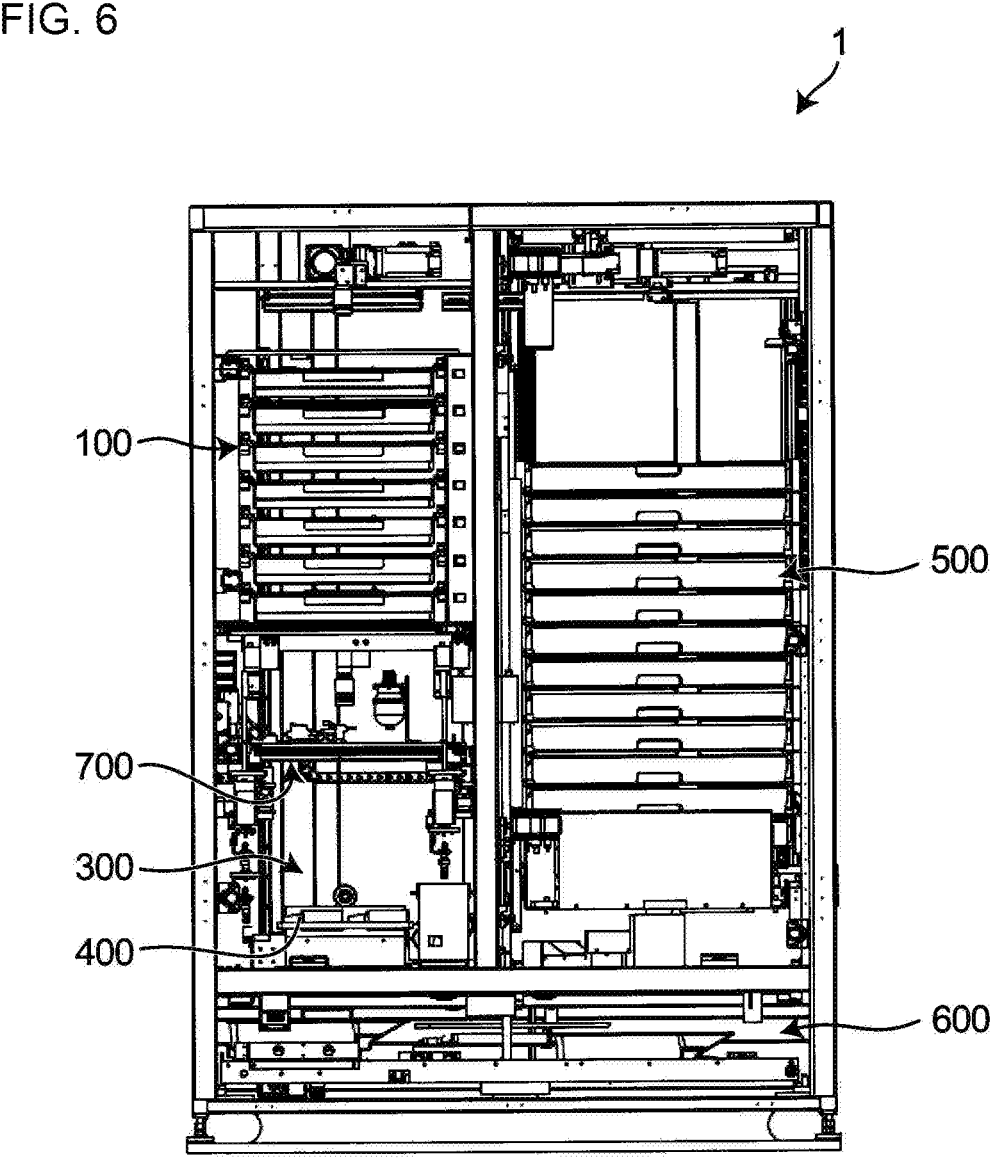
FIG. 6 is a front view of the returned medicine dispensing apparatus in the state that the external panel is removed.

As shown in FIGS. 1 to 3, the receiving part 100 is arranged on the left upper and front side when the returned medicine supplying apparatus 1 is viewed from the front side.

Figure 7:
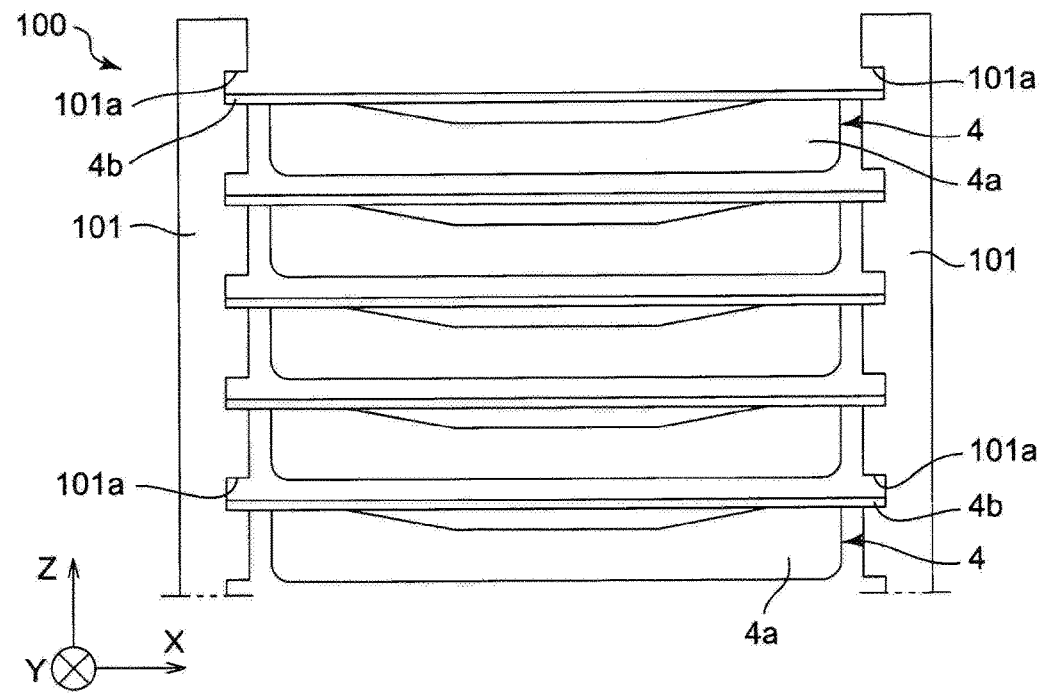
FIG. 7 is a schematic front view of a receiving part.

Referring to FIGS. 1 to 3 together with FIG. 7, the receiving part 100 includes fixed rack members 101 arranged so as to face each other in the horizontal direction (the X direction in the drawings). A plurality of pairs of rail grooves 101a, 101a for holding a plurality of returned goods trays (receiving containers) 4 in a state that the plurality of returned goods trays 4 are arranged in multiple stages are formed on the rack members 101.

Figure 8:
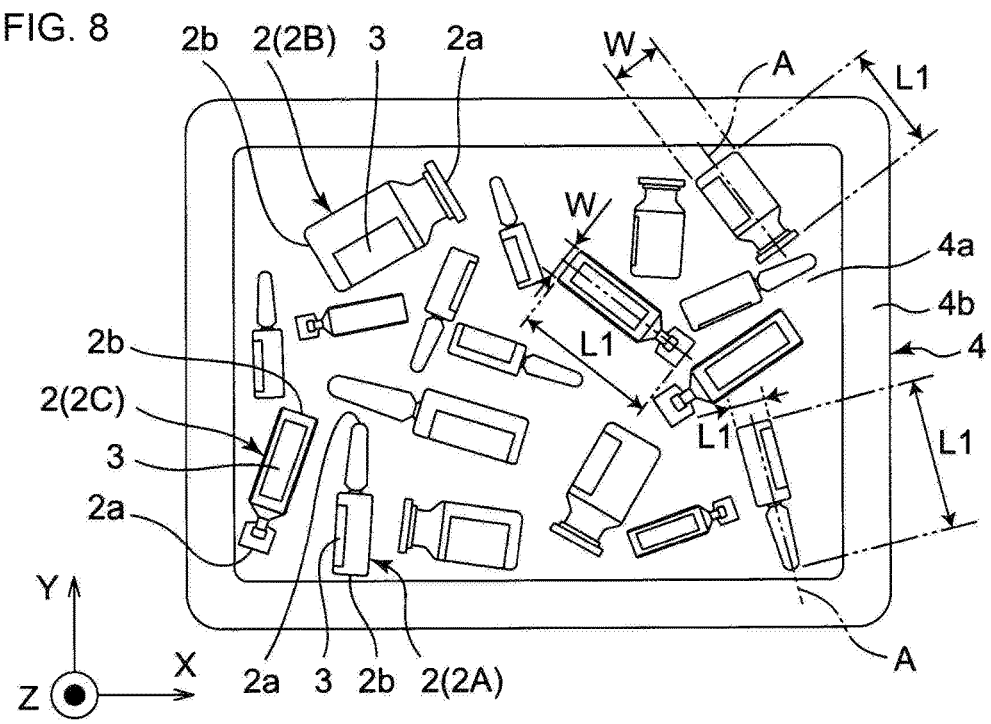
FIG. 8 is a schematic planar view of a returned goods tray.
Figure 9:
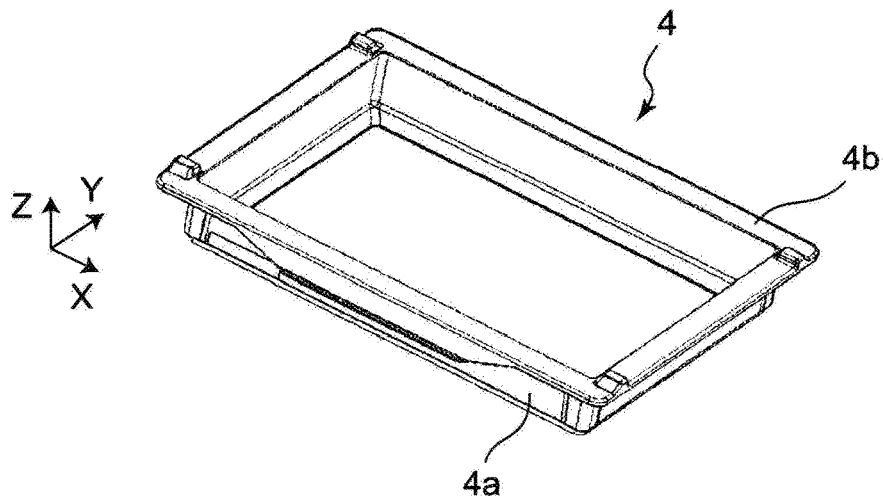
FIG. 9 is a perspective view of the returned goods tray.

Referring to FIGS. 8 and 9, the returned goods tray 4 includes a tray main body 4a opening toward the upper side in the drawing and a flange portion 4b provided on an upper end of the tray main body 4a. As shown in FIG. 8, the returned medicines 2 (for example, the ampule 2A, the vial 2B and the resin ampule 2C) contained in the returned goods tray 4 have different characteristics such as the shape, the size (the length L1 and the width W), the type and the expiration date. Further, directions and postures of the returned medicines 2 contained in the returned goods tray 4 are not aligned, thus the directions and the postures of the returned medicines 2 are different from each other. Namely, the returned medicines 2 contained in the returned goods tray 4 are in a non-aligned state. Here, the direction of each of the returned medicine 2 means a direction in which a longitudinal direction of the returned medicine 2 (an axial line A of the returned medicine 2) in the X-Y plane in the drawing extends. The language of "the direction of the returned medicine 2" often contains a direction in which a tip end 2a and a base end 2b of the returned medicine 2 are directed in addition to the direction in which the axial direction A of the returned medicine extends. However, the characteristics such as the shape, the size, the type and the expiration date of each of the returned medicines 2 contained in the returned goods tray 4 may be unified. Further, the directions and the postures of the returned medicines 2 contained in the returned goods tray 4 may be aligned. The returned medicines 2 are contained in the returned goods tray 4 so as not to be partially overlapped with each other.

As shown in FIG. 7, the flange portion 4b of the returned goods tray 4 is supported by the rail grooves 101a, 101a respectively formed on the rack members 101. Each of the rail grooves 101a, 101a is formed so as to pass through from a front side end to a rear side end of each of the rack members 101 in the Y direction in the drawing of the rack members 101. Thus, an operator such as a medical staff can take the returned goods tray 4 into and from the rail grooves 101a, 101a from the front side of the returned medicine supplying apparatus 1. Further, the elevating part 200 described below can take the returned goods tray 4 into and from the rail grooves 101a, 101a from the rear side of the returned medicine supplying apparatus 1.

(Elevating Part)

As shown in FIGS. 1 to 3, the elevating part 200 is arranged on the left rear side when the returned medicine supplying apparatus 1 is viewed from the front side.

Figure 10:
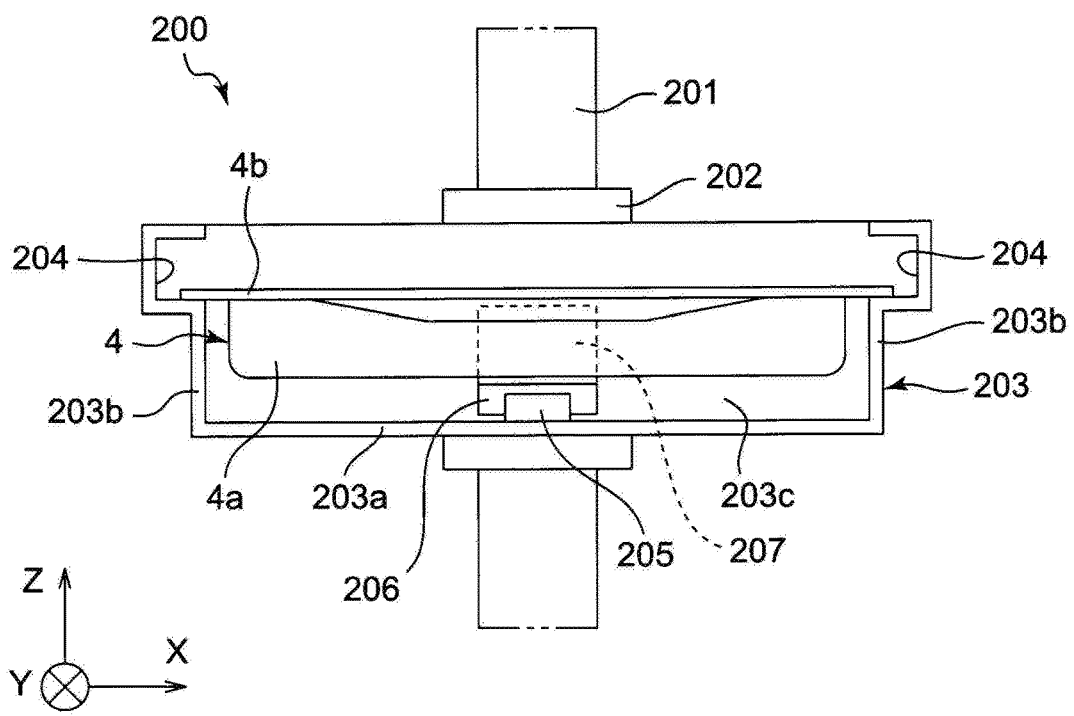
FIG. 10 is a schematic front view of an elevating part.

Referring to FIGS. 1 to 3 together with FIG. 10, the elevating part 200 includes a fixed linear motion guide 201 extending in the Z direction, a carriage 202 elevating along the linear motion guide 201 and a table 203 mounted on the carriage 202. The table 203 includes a bottom portion 203a, lateral portions 203b, 203b respectively provided on the right side and the left side of the bottom portion 203a and an end portion 203c provided on the rear side of the bottom portion 203a (the rear side of the Y direction). The table 203 opens toward the front side (the front side of the Y direction). The table 203 opens toward the rear side (the rear side of the Y direction). Rail grooves 204, 204 are respectively formed on the lateral portions 203b, 203b. The flange portion 4b of the returned goods tray 4 is supported by the rail grooves 204, 204. This makes it possible to hold the returned goods tray 4 in the table 230.

Keeping referring to FIG. 10, a fixed linear motion guide 205 extending in the depth direction of the returned medicine supplying apparatus 1 (the Y direction) is provided on the bottom portion 203a. Further, a base end of a hook 207 is fixed to a carriage 206 which can horizontally move along this linear motion guide 205.

The elevating part 200 can take one of the returned goods trays 4 from the receiving part 100 to move the one returned goods tray 4 down to a height position (schematically represented by a symbol H in FIG. 1) same as a height position of the identifying part 300 described below (this operation is referred to as a returned goods tray taking operation). Further, the elevating part 200 can return the one returned goods tray 4 from the height position H same as the height position of the identifying part 300 into the receiving part 100 (this operation is referred to as a returned goods tray returning operation).

Description will be given to the returned goods tray taking operation. First, the table 203 (carriage 202) is moved up to a position slightly lower than the rail grooves 101a, 101a of the receiving part 100 in which the returned goods tray 4 to be taken is held. Next, the hook 207 (carriage 206) is moved toward the front side (the front side of the Y direction) from the side of the end portion 203c of the table 203. Subsequently, the table 203 is slightly moved up. As a result, the hook 207 is moved into a space between the flange portion 4b of the returned goods tray 4 (a portion on the rear side in the drawings) and the tray main body 4a. Then, the hook 207 is moved back toward the rear side (the rear side of the Y direction) so that the hook 207 is moved toward the side of the end portion 203c of the table 203. Due to this backing movement of the hook 2007, the flange portion 4b is pulled into the rail groove 204 to transfer and place the returned goods tray 4 from the receiving part 100 onto the table 203. Finally, the table 203 (carriage 202) is moved down to the position represented by the symbol H (in FIG. 1).

Description will be given to the returned goods tray returning operation. First, the table 203 (carriage 202) is moved up from the position represented by the symbol H to a height corresponding to the rail grooves 101a, 101a (which have not held the returned goods tray 4) in which the returned goods tray 4 is to be returned. Next, the hook 207 (carriage 206) is then moved toward the front side (the front side of the Y direction) from the side of the end portion 203c of the table 203. As a result, the flange portion 4b of the returned goods tray 4 pushed by the hook 207 is moved out of the rail grooves 204, 204 and moved into the rail grooves 101a, 101a of the receiving part 100. Then, the table 203 is slightly moved down. Due to this movement of the table 203, the hook 207 is downwardly moved out of the gap between the flange portion 4b of the returned goods tray 4 (the portion on the rear side in the drawings) and the tray main body 4a. Finally, the hook 207 is moved back toward the rear side so that the hook 207 is moved toward the side of the end portion 203c of the table 203.

(Orthogonal Type Robot)

Figure 11:
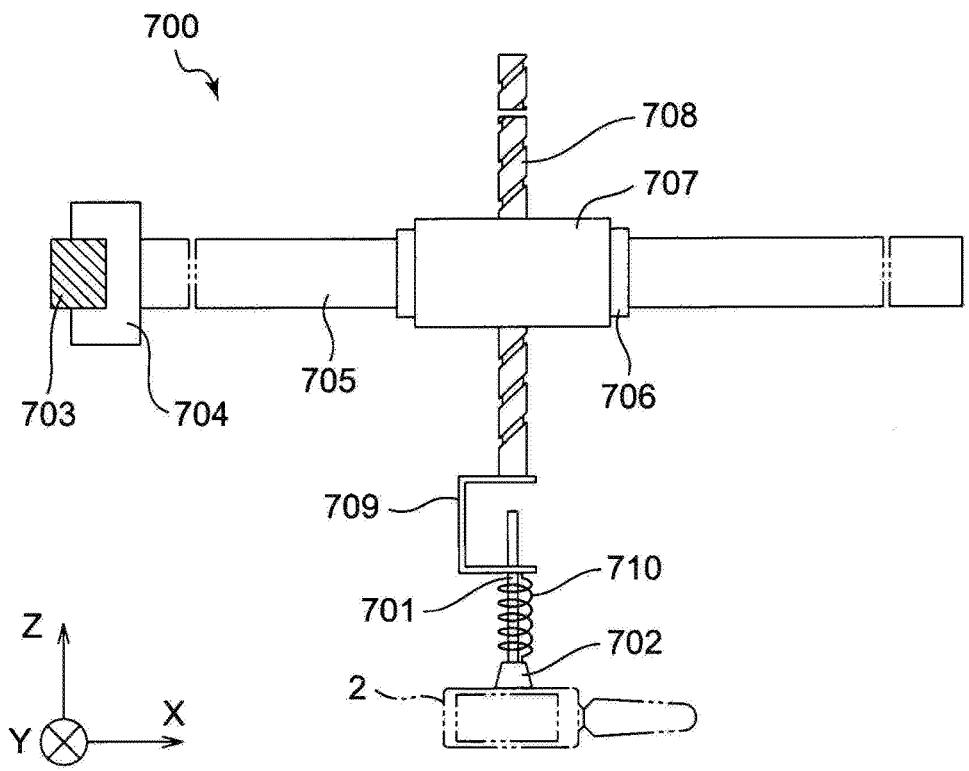
FIG. 11 is a schematic front view of an orthogonal type robot.

Referring to FIG. 11, the orthogonal type robot 700 (a first picking part) includes a suctioning nozzle 701 for suctioning the returned medicine 2 with vacuum supplied from a vacuum source (not shown in the drawings) so that the returned medicine 2 can be released. A suctioning pad 702 made from rubber is attached to a tip end of the suctioning nozzle 701. Referring to FIGS. 1 to 3, the orthogonal type robot 700 is configured so that a range in which the suctioning nozzle 701 can suction and hold the returned medicine 2 or release the suctioned and held returned medicine 2 by releasing the suctioning contains an entire range of the elevating part 200 (the returned goods tray 4 positioned at the described height position H), the identifying part 300 and the non-stored medicine arrangement part 400.

The orthogonal type robot 700 (suctioning nozzle 701) can suction and hold the returned medicine 2 to take the returned medicine 2 from the returned goods tray 4 held by the table 203 of the elevating part 200 (positioned at the height position H) and transfer the returned medicine 2 to an after-mentioned temporarily placing part (a first identifying part) 301 included in the identifying part 300. Further, the orthogonal type robot 700 can suction and hold the returned medicine 2 to take the returned medicine 2 from the temporarily placing part 301 and transfer the returned medicine 2 to an after-mentioned label reading part (a second identifying part) 302 included in the identifying part 300. Furthermore, the orthogonal type robot 700 can suction and hold the returned medicine 2 to take the returned medicine 2 from the label reading part 302 and transfer the returned medicine 2 to the non-stored medicine arrangement part 400.

Referring to FIGS. 1 to 3 and 11, the orthogonal type robot 700 includes a fixed Y-axis beam 703 extending in the depth direction of the returned medicine supplying apparatus 1 (the Y direction) on the lower side than the receiving part 100 and a carriage 704 which can move along this Y-axis beam 703. An X-axis beam 705 extending in the width direction of the returned medicine supplying apparatus 1 (the X direction) is fixed to the carriage 704. Further, a carriage 706 which can move on the X-axis beam 705 is provided and a head 707 is mounted on this carriage 706. An elevating rod 708 which can elevate due to a ball screw mechanism is provided at the head 707. The suctioning nozzle 701 is held by a bracket 709 fixed to a lower end of the elevating rod 708. The suctioning nozzle 701 can rotate with respect to the bracket 709 around the Z axis. A spring 701 illustrated in only FIG. 11 is intervened between the bracket 709 and the suctioning nozzle 701 and thus the suctioning nozzle 701 can be elastically moved up with respect to the bracket 709. Further, a position sensor (not shown in the drawings) for detecting a relative height position (a position in the Z direction) of the suctioning nozzle 701 with respect to the bracket 709 is mounted on the carriage 706.

The returned medicine 2 suctioned and held by the suctioning nozzle 701 can be moved in the X direction by the linear motion of the carriage 706, in the Y direction by the linear motion of the carriage 704 and in the Z direction by the elevating of the elevating rod 708. Further, the returned medicine 2 suctioned and held by the suctioning nozzle 701 can be rotated around an axial line of the suctioning nozzle 701 (the Z axis) by the rotation of the suctioning nozzle 701 with respect to the bracket 709.

(Identifying Part and Non-stored Medicine Arrangement Part)

Referring to FIGS. 1 to 3, the identifying part 300 includes a lighting part 303 and a camera 304 (a first photographing part). The lighting part 303 and the camera 304 are positioned on the upper side of the elevating part 200. Further, the identifying part 300 includes the temporarily placing part 301 constituting one example of the first identifying part of the present invention in cooperation with the camera 304 and the label reading part (one example of the second identifying part of the present invention) 302. The temporarily placing part 301 and the label reading part 302 are arranged on the left lower and front side when the returned medicine supplying apparatus 1 is viewed from the front side. Further, the temporarily placing part 301 and the label reading part 302 are positioned on the lower side of the receiving part 100.

Figure 12:
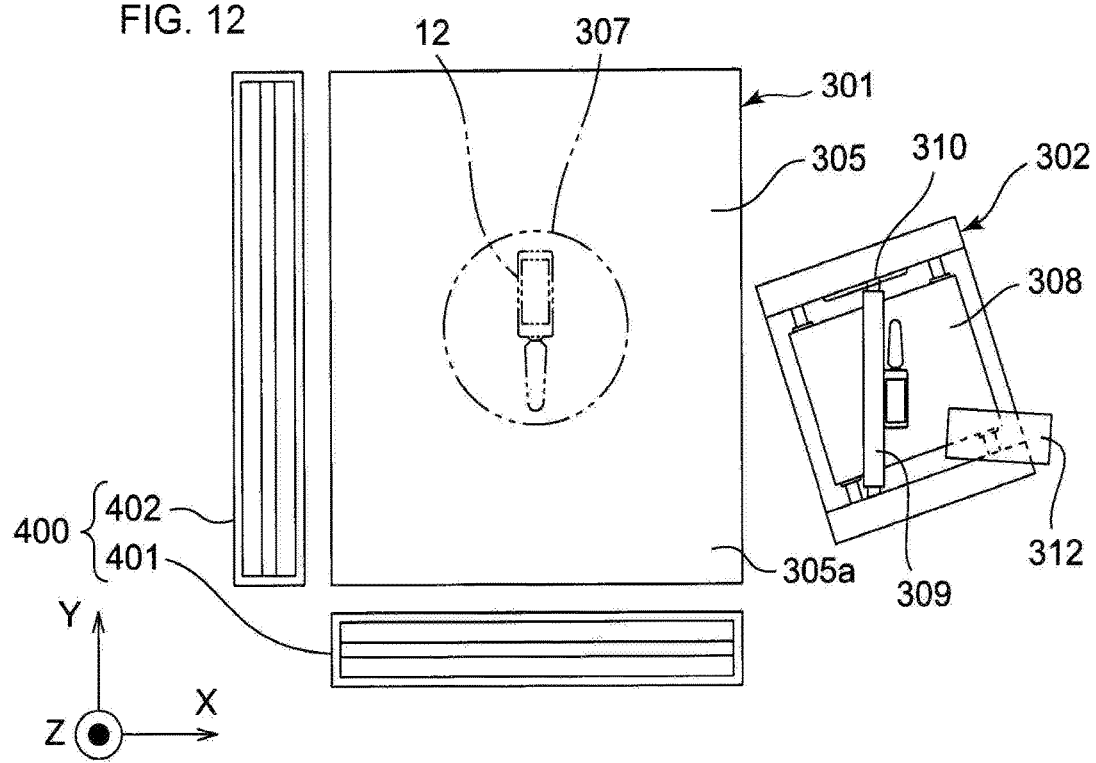
FIG. 12 is a schematic planar view of an identifying part and a non-stored medicine arrangement part.

Referring to FIGS. 1 to 3 along with FIG. 12, the temporarily placing part 301 includes a semi-transparent plate 305 on which the returned medicine 2 is to be placed, a lighting part 306 arranged on the lower side of this semi-transparent plate 305 and a camera 307 (a second photographing part) positioned on the upper side of the semi-transparent plate 305.

Figure 13:
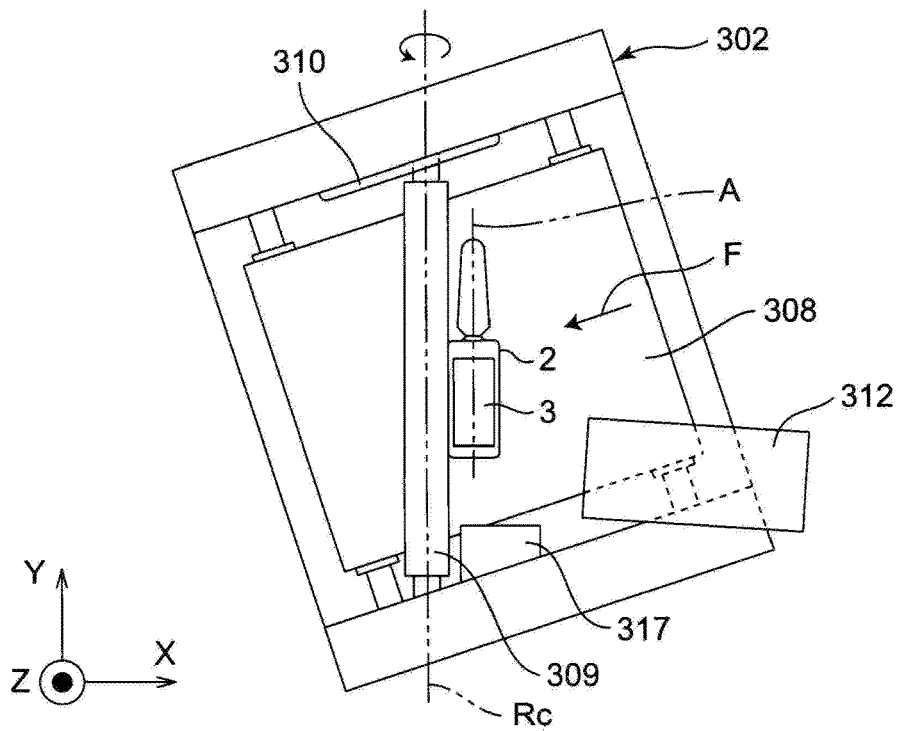
FIG. 13 is a schematic planar view of a label reading part.

Referring to FIGS. 1 to 3 along with FIG. 13, the label reading part 302 includes an endless belt 308 which is to be rotary-driven and a roller 309 arranged on this endless belt 308. When the endless belt 308 and the roller 309 are rotated, the returned medicine 2 is rotated around an axial line A of the returned medicine 2 in the longitudinal direction thereof. Further, the label reading part 302 includes a lighting part 310 and a camera 311 (one example of a third photographing part of the present invention) illustrated in only FIG. 1. Furthermore, the label reading part 302 includes a barcode reader (a first barcode reader) 312.

Referring to FIG. 12, the non-stored medicine arrangement part 400 includes two non-stored medicine arrangement boxes 401, 402 arranged adjacent to the temporarily placing part 301. Each of these non-stored medicine arrangement boxes 401, 402 includes an arrangement groove, which is similar to an arrangement groove of the storing tray (the storing container) 5 described below, for holding the returned medicines 2.

(Operation Until Identification of Returned Medicine Completes)

Here, description will be given to an operation of the returned medicine supplying apparatus 1 until the identification of the direction, the posture and the characteristics such as the type, the shape, the size and the expiration date for the returned medicine 2 stored in the returned goods tray 4 of the receiving part 100 completes.

First, the returned goods tray 4 is transferred and placed from the receiving part 100 onto the table 203 of the elevating part 200. After transferring and placing the returned goods tray 4, the table 203 is moved down to the height position H (see FIG. 1). After the table 203 has been moved down to the height position H, an identification process by the identifying part 300 is started. First, the returned goods tray 4 is photographed by the camera 304 with irradiating the returned goods tray 4 on the table 203 from the upper side with illumination light from the lighting part 303 (it is preferable that this illumination light is light having high directionality). Then, a position of the returned medicine 2 in the returned goods tray 4, the direction of the returned medicine 2 (which is a direction in which the axial line A extends in the X-Y plane and which does not contain a direction in which the tip end 2a and the base end 2b are directed) and a substantially intermediate position of the returned medicine 2 (a position suitable for suctioning and holding the returned medicine 2) are identified from an elongated area where the returned medicine 2 contained in an image photographed by the camera 304 strongly reflects the illumination light. Based on this identifying result, the suctioning nozzle 701 of the orthogonal type robot 700 suctions and holds the returned medicines 2 in the returned goods tray 4 one by one to transfer and place the returned medicines 2 onto the semi-transparent plate 305 of the temporarily placing part 301 (see FIG. 12). At this time, the suctioning nozzle 701 adjusts the direction of the suctioned and held returned medicine 2 by utilizing the rotation of the suctioning nozzle 701 around the axial line thereof (the Z axis).

In the temporarily placing part 301, while the lighting part 306 emits the illumination light (it is preferable that this illumination light is light having a high luminance) from the lower side of the semi-transparent plate 305, the photographing by the camera 307 is performed. Based on an image photographed by the camera 307, the shape, the size and the direction (including the direction in which the axial line A of the returned medicine 2 in the X-Y plane extends and the tip end 2a and the base end 2b are directed) of the returned medicine 2 are identified (details will be described below). Further, based on the image photographed by the camera 307, a suctioning position for the returned medicine 2 (a position where the returned medicine 2 is suctioned by the suctioning nozzle 701 of the orthogonal type robot 700 or the suctioning nozzle 801 of the scalar type robot 800) is calculated. This method for calculating the suctioning position for the returned medicine 2 will be described below. Based on the identifying result from the image photographed by the camera 307, the suctioning nozzle 701 of the orthogonal type robot 700 suctions and holds the returned medicine 2 on the semi-transparent plate 305 to transfer and place the returned medicine 2 onto the label reading part 302. At this time, the suctioning nozzle 701 adjusts the direction of the suctioned and held returned medicine 2 by utilizing the rotation of the suctioning nozzle 701 around the axial direction thereof (the Z axis).

In the label reading part 302, the returned medicine 2 is rotated around the axial line A thereof (see FIG. 13) by the rotations of the endless belt 308 and the roller 309 (details will be described below). The camera 311 photographs this rotating returned medicine 2 with irradiating the returned medicine 2 with illumination light from the lighting part 310. Based on an image photographed by the camera 311, the literal information related to the expiration date or the like indicated on the label 3 of the returned medicine 2 is identified and the posture of the returned medicine 2 around the axial line A is identified. In addition to the photographing by the camera 311, the barcode contained in the label 3 is read by the barcode reader 312. Based on the image photographed by the camera 311 and the barcode read by the barcode reader 312, the type and the expiration date of the returned medicine 2 are identified. The identification of the type and the expiration date of the medicine may be performed based on only one of the image photographed by the camera 311 and the barcode read by the barcode reader 312. For example, in the case where the barcode contained in the label 3 of the returned medicine 2 contains the type and the expiration date of the returned medicine 2, the camera 311 may not be provided and only the barcode reader 312 may be provided. In this case, it is possible to identify the type and the expiration date of the returned medicine 2 by reading the barcode with the barcode reader 312. After the identification process completes, the rotations of the endless belt 308 and the roller 309 are stopped so that the rotation of the returned medicine 2 around the axial line A is stopped in a posture that the barcode of the label 3 is directed toward the upper side (the Z direction). It is possible to check whether or not the label 3 is directed toward the upper side based on the photographed image of the camera 311. In this regard, in the case where the returned medicine 2 has an area in which the suctioning nozzle 801 of the after-mentioned scalar type robot 800 cannot suction the returned medicine 2 (for example, the case where the returned medicine 2 has an area in which a burr exists such as a lateral surface of the resin ampule 2C or an area in which the label is likely to be peeled when the label in this area is suctioned), it is preferable that the rotation of the returned medicine 2 is stopped so that this area is not directed toward the upper side. For this purpose, this suctioning impossible area is preliminarily registered (preliminarily stored) in an after-mentioned medicine master in a state that the suctioning impossible area is associated with the medicine.

In the label reading part 302, the returned medicine 2 is rotated around the axial line A by not a pair of rollers but the rotations of the endless belt 308 and the roller 309. The combination of the endless belt 308 and the roller 309 can rotate the returned medicine 2 having a broader range of the shape, the size and the type of the returned medicine 2 compared with the case of using the pair of rollers.

Even if the label reading part 302 takes a configuration in which the returned medicine 2 is rotated by the pair of rollers, there is a case where the returned medicine 2 is moved toward one of two directions along rotational axes of the pair of rollers due to a relative inclination or misalignment between the rotational axes of the pair of rollers. For limiting this moving direction of the returned medicine 2 to one direction, it is required to exactly adjust the relative inclination or misalignment between the rotational axes of the pair of rollers. Further, in this case, there is a case where the returned medicine 2 is moved toward one of the two directions along the rotational axes of the pair of rollers due to a situation that the returned medicine 2 is supplied on the pair of rollers in a posture that the returned medicine 2 is inclined with respect to the pair of rollers.

In contrast, in this embodiment, as most clearly shown in FIG. 13, a rotational axis of the roller 309 is inclined with respect to a travelling direction of the endless belt 308. Due to such an arrangement of the endless belt 308 and the roller 309, it is possible to limit the moving direction of the returned medicine 2 in a width direction of the endless belt 308 to one direction (the lower direction in FIG. 13). As a result, it is possible to make the position of the returned medicine 2 constant in the label reading part 302.

In the case where the expiration date identified by the label reading part 302 has already expired or the case where the expiration date cannot be identified by the label reading part 302, this returned medicine 2 is suctioned and held by the suctioning nozzle 701 of the orthogonal type robot 700 to transfer and place the returned medicine 2 into one of the non-stored medicine arrangement boxes 401, 402 of the non-stored medicine arrangement part 400. Further, one of the returned goods trays 4 of the receiving part 100 (for example, the returned goods tray 4 in the lowest stage) may be used as a tray for the non-stored medicine and the returned medicine 2 in the one of the non-stored medicine arrangement boxes 401, 402 may be returned to this returned goods tray 4.

(Scalar Type Robot and Support Tray)

Figure 14:
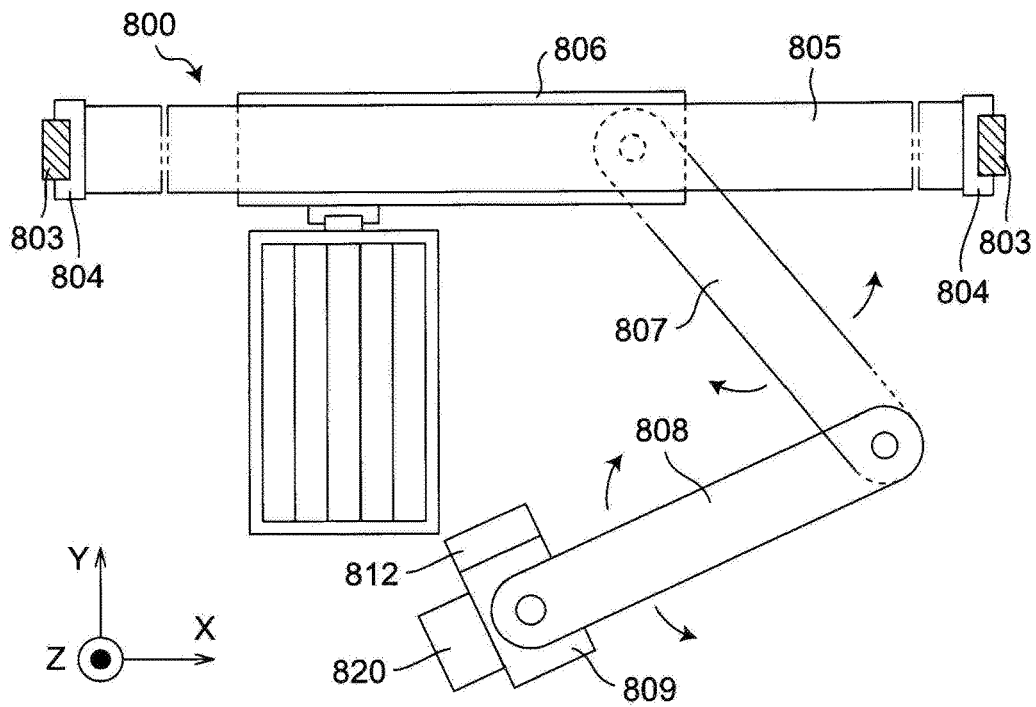
FIG. 14 is a schematic planar view of a scalar type robot and a support tray.
Figure 15:
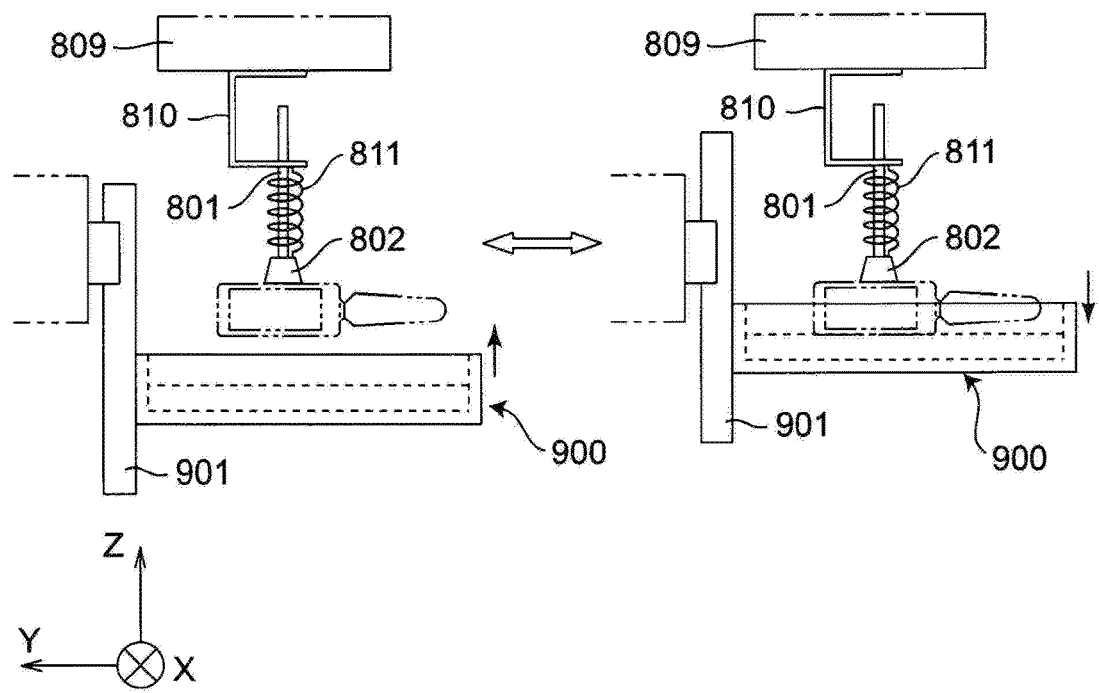
FIG. 15 is a schematic side view of the scalar type robot and the support tray.

Referring to FIGS. 14 and 15, the scalar type robot 800 (a second picking part) includes a suctioning nozzle 801 for suctioning the returned medicine 2 with vacuum supplied from a vacuum source (not shown in the drawings) so that the returned medicine 2 can be released. A suctioning pad 802 made from rubber is attached to a tip end of the suctioning nozzle 801. The scalar type robot 800 is configured so that a range in which the suctioning nozzle 801 can suction and hold the returned medicine 2 or release the suctioned and held returned medicine 2 by releasing the suctioning contains the label reading part 302 of the identifying part 300, all ranges of all storing trays 5 included in the storing part 500 and an entire range of a dispensing tray 8 arranged at a dispensing position described below.

The scalar type robot 800 (suctioning nozzle 801) can suction and hold the returned medicine 2 to take the returned medicine 2 from the label reading part 302 of the identifying part 300 and transfer the returned medicine 2 to the after-mentioned storing tray 5 included in the storing part 500. Further, the scalar type robot 800 can suction and hold the returned medicine 2 to take the returned medicine 2 from the storing tray 5 and transfer the returned medicine 2 to the after-mentioned dispensing tray 8 included in the dispensing part 600.

Referring to FIGS. 1 to 3, 14 and 15, the scalar type robot 800 includes a pair of fixed linear motion guides 803, 803 extending in the height direction of the returned medicine supplying apparatus 1 (the Z direction) and carriages 804, 804 which can respectively move on these linear motion guides 803, 803. Due to the carriages 804, 804, end portions of an X-axis beam 805 extending in the width direction of the returned medicine supplying apparatus 1 (the X direction) are supported. A base 806 is fixed to the X-axis beam 805. A base end portion of a first arm 807 connected to the base 806 can pivotally move around the Z axis and a base end portion of a second arm 808 connected to a tip end portion of the first arm 807 can also pivotally move around the Z axis. A head 809 is attached to a tip end portion of the second arm 808. The suctioning nozzle 801 is held by a bracket 810 fixed to the head 809. The suctioning nozzle 801 is rotated with respect to the bracket 810 around the Z axis. A spring 811 illustrated in only FIG. 15 is intervened between the bracket 810 and the suctioning nozzle 801. Thus, the suctioning nozzle 801 can be elastically moved up with respect to the bracket 810.

A barcode reader 812 (a second barcode reader) illustrated in only FIG. 14 and a presence detecting sensor 820 for detecting the returned medicine 2 are mounted on the head 809. The barcode reader 812 is mounted at a position shifting to the lateral direction with respect to the suctioning nozzle 801 so that the barcode reader 812 can read the barcode of the label 3 adhering to the returned medicine 2 positioned on the lower side of the suctioning nozzle 801 from the diagonally upward direction. In other words, the barcode reader 812 is arranged so as to face the barcode of the label 3 adhering to the returned medicine 2 when the suctioning nozzle 801 is positioned on the upper side of the target returned medicine 2 in the same as the positional relationship of the barcode reader 312 with respect to the returned medicine 2 in the label reading part 302.

In this embodiment, the presence detecting sensor 820 is a reflecting type photoelectric sensor. The presence detecting sensor 820 emits light toward a lower area below the suctioning nozzle 801 and receives reflected light of this light to detect whether or not the returned medicine 2 is present in the lower area below the suctioning nozzle 801.

The returned medicine 2 suctioned and held by the suctioning nozzle 801 is moved in the Z direction due to the linear motion of the X-axis beam 805 (carriage 804) and moved in the X-Y plane due to the pivotal movements of the first arm 807 and the second arm 808. Further, the returned medicine 2 suctioned and held by the suctioning nozzle 801 is rotated around the axial line of the suctioning nozzle 801 (the Z axis) due to the rotation of the suctioning nozzle 801 with respect to the bracket 810.

Referring to FIGS. 1, 14 and 15, the support tray 900 is fixed to a lower end of a rod 901 which can elevate with respect to the base 806 of the scalar type robot 800. In this embodiment, the support tray 900 includes the same arrangement groove for holding the returned medicine 2 as that of the storing tray 5 described below. As shown in FIG. 15, due to the elevating of the rod 901, the support tray 900 is elevated to a height position where the support tray 900 approaches to the returned medicine 2 suctioned and held by the suctioning nozzle 801 and a height position where the support tray 900 separates from the returned medicine 2 suctioned and held by the suctioning nozzle 801.

When the suctioning nozzle 801 suctions and transfers the returned medicine 2, the scalar type robot 800 uses the first arm 807 and the second arm 808 to move the suctioning nozzle 801 in the horizontal direction to position the suctioning nozzle 801 on the upper side of the support tray 900. At this time, the head 809 is rotated so that the direction of the suctioned returned medicine 2 coincides with a direction of the arrangement groove of the support tray 900. Then, the rod 901 is moved toward the upper direction to transfer the support tray 900 to the height position where the support tray 900 approaches to the returned medicine 2 from the height position where the support tray 900 separates from the returned medicine 2. With this configuration, even if the returned medicine 2 being transferred is unintentionally released from the suctioning pad 802 and/or a small type suctioning pad being suctioning the returned medicine 2, it is possible to prevent the returned medicine 2 from dropping toward the lower direction of the suctioning nozzle 801 with the support tray 900. With this configuration, it is possible to prevent the returned medicine 2 from being damaged by the unintentional releasing of the suctioning and transfer the returned medicine 2 at a higher speed.

Further, the returned medicine 2 dropped into the support tray 900 may be re-suctioned and transferred by the suctioning nozzle 801. At this time, a pressure sensor (not shown in the drawings) provided at the suctioning nozzle 801 may detect that the suctioning of the suctioning nozzle 801 is unintentionally released. Further, since the returned medicine 2 is transferred in a state that the direction of the returned medicine 2 coincides with the direction of the arrangement groove on the support tray 900 as described above, the returned medicine 2 drops into the arrangement groove provided immediately below the suctioning nozzle 801 without changing the direction and the posture of the returned medicine 2 when the suctioning of the suctioning nozzle 801 is unintentionally released. With this configuration, it is possible to predict that the returned medicine 2 exists immediately below the suctioning nozzle 801, thereby improving a success rate at the time of re-suctioning the returned medicine 2 with the suctioning nozzle 801.

(Storing Part)

As shown in FIGS. 1 to 3, the storing part 500 is arranged on the right and rear side when the returned medicine supplying apparatus 1 is viewed from the front side.

Figure 16:
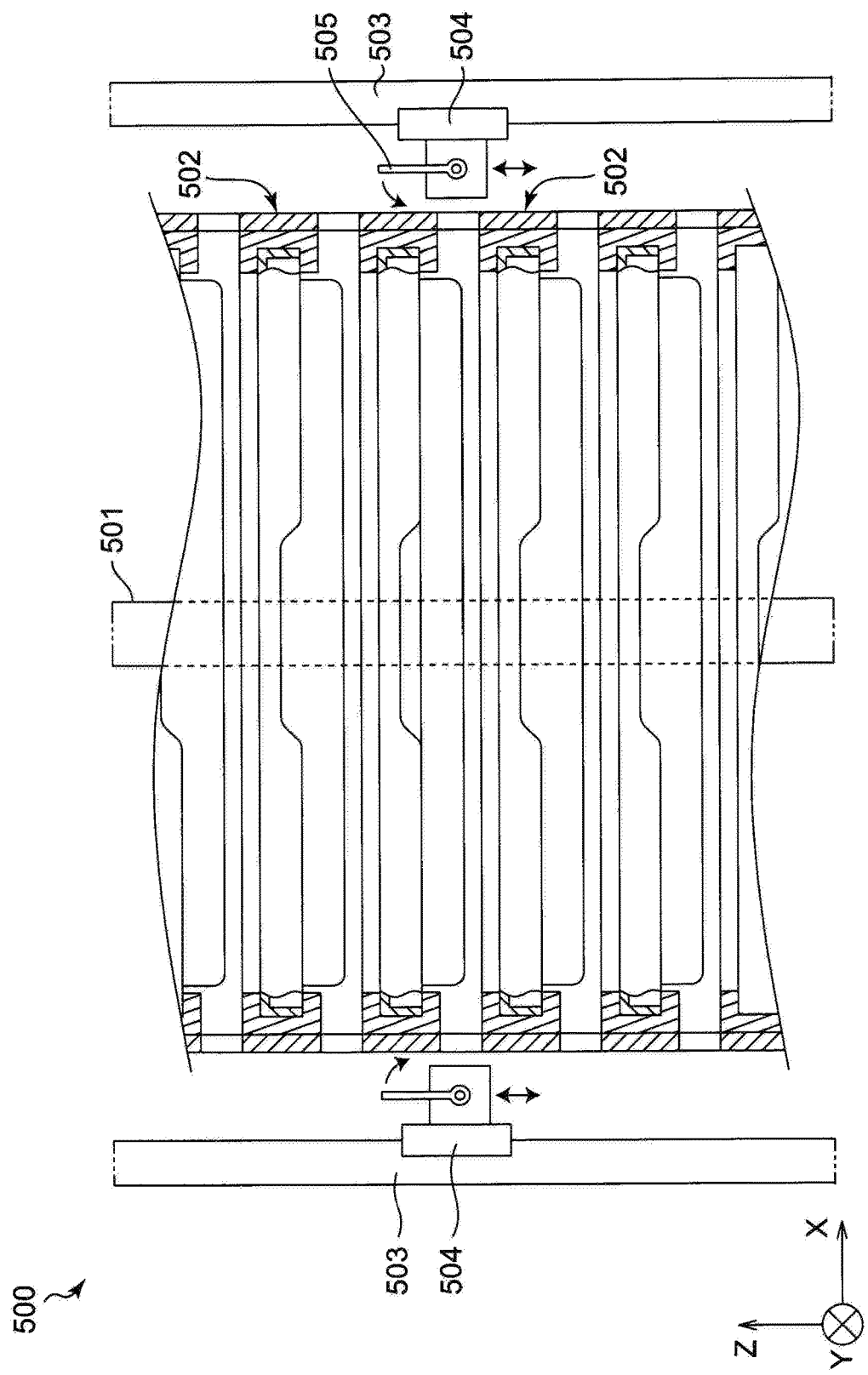
FIG. 16 is a schematic front view of a storing part.
Figure 17:
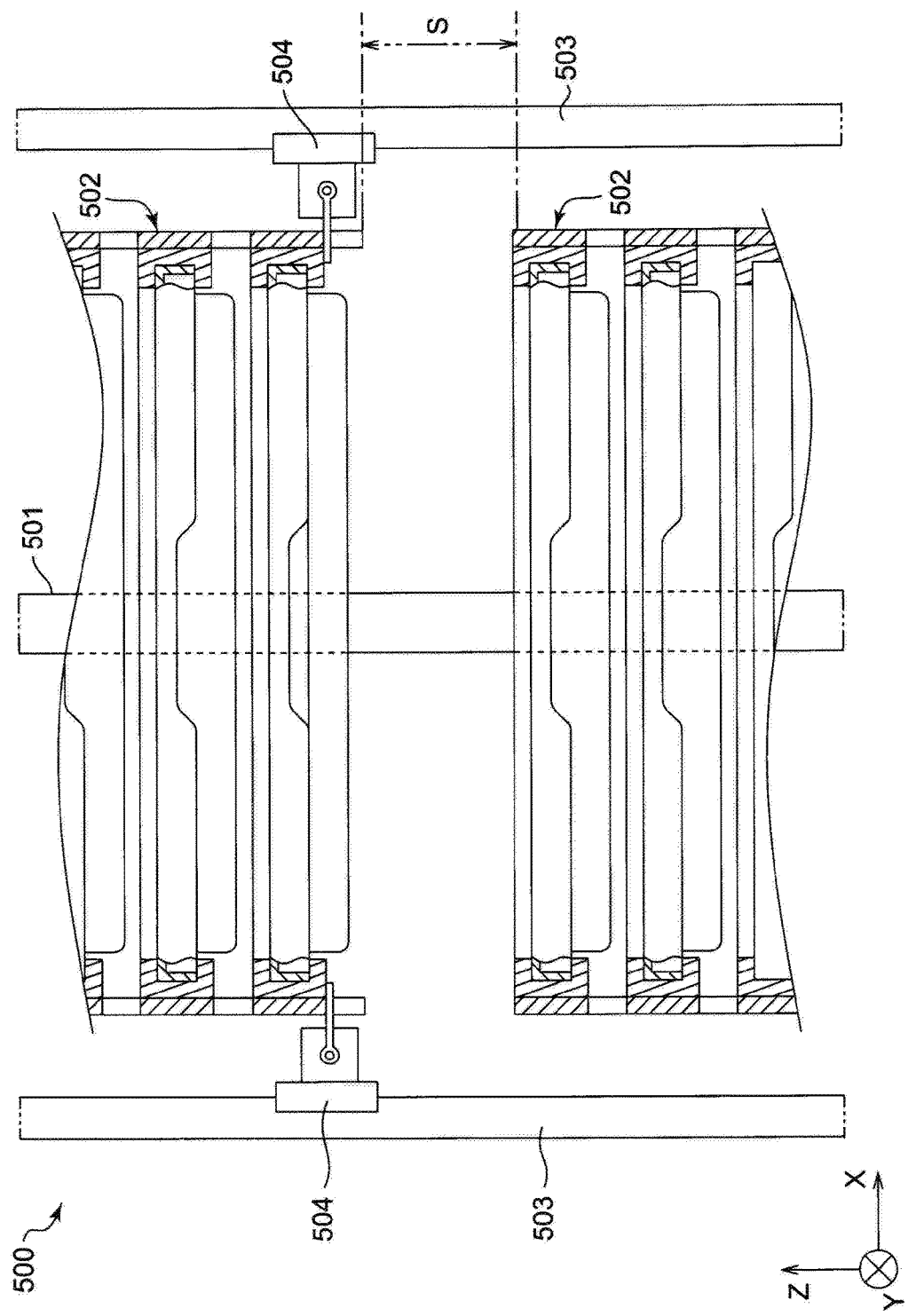
FIG. 17 is another schematic front view of the storing part.
Figure 18A:
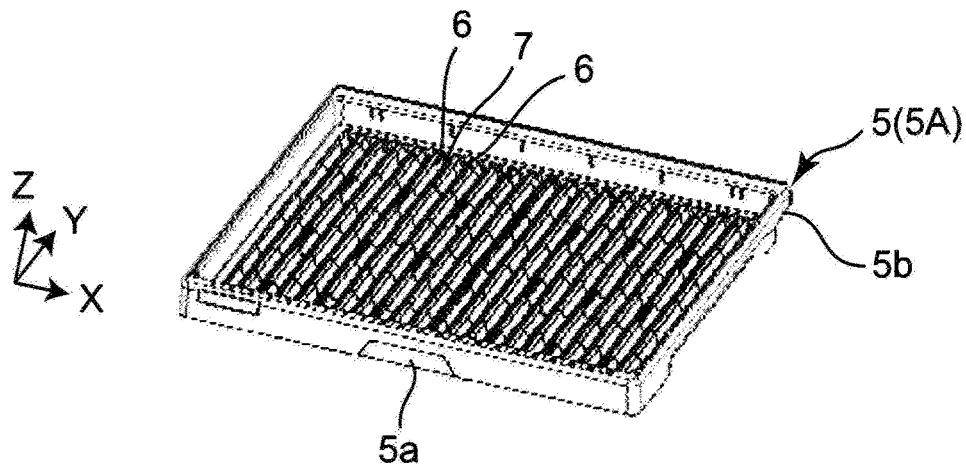
FIG. 18A is a perspective view of a storing tray (S-size).
Figure 18B:
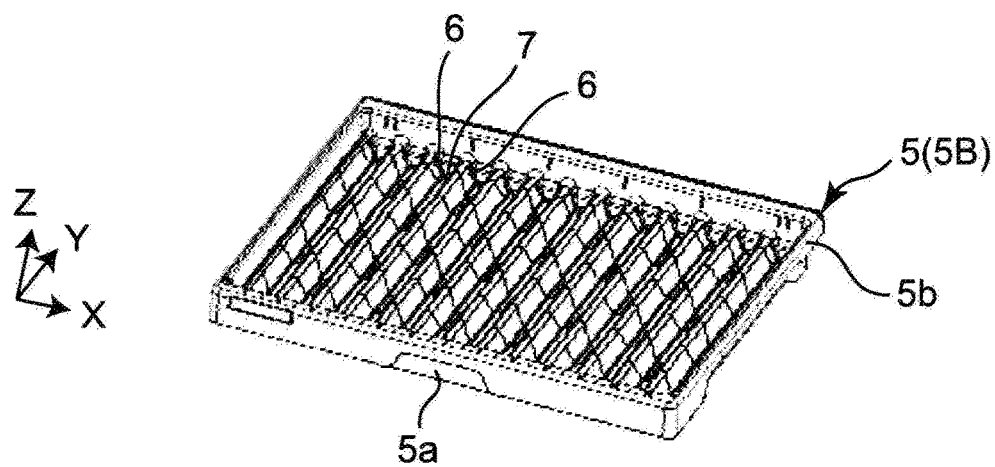
FIG. 18B is a perspective view of a storing tray (M-size).
Figure 18C:
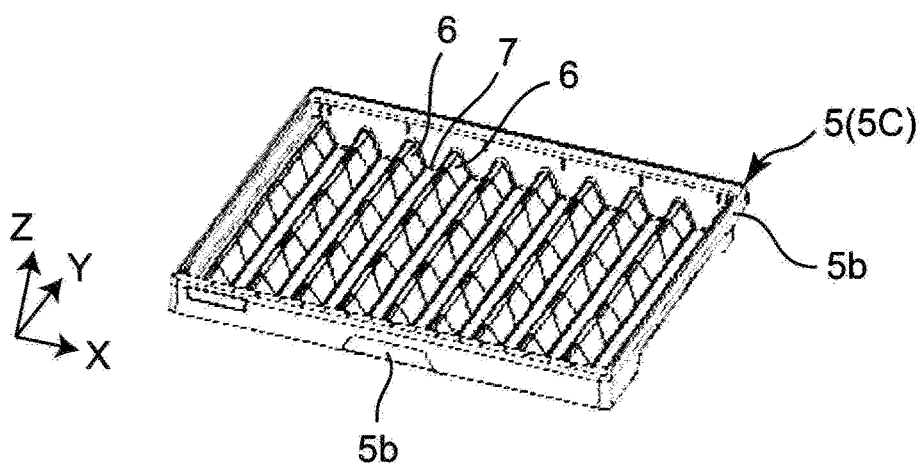
FIG. 18C is a perspective view of a storing tray (L-size).
Figure 19A:
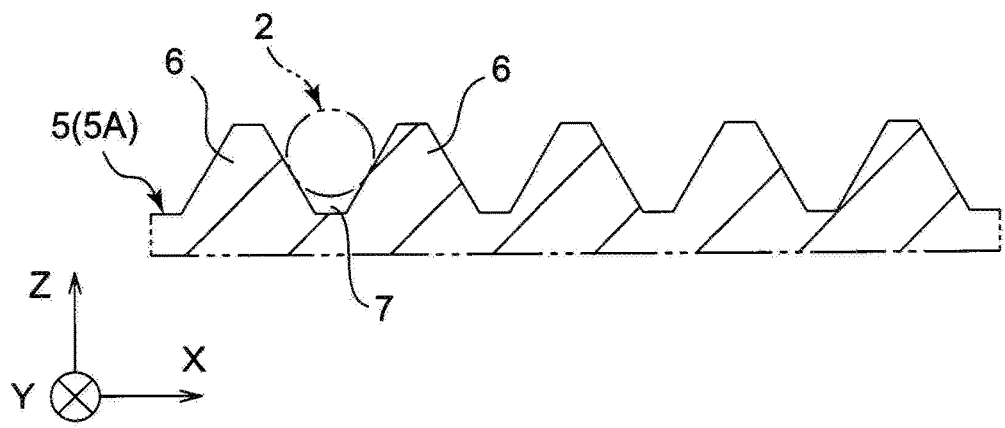
FIG. 19A is a schematic partially enlarged cross-sectional view of FIG. 18A.
Figure 19B:
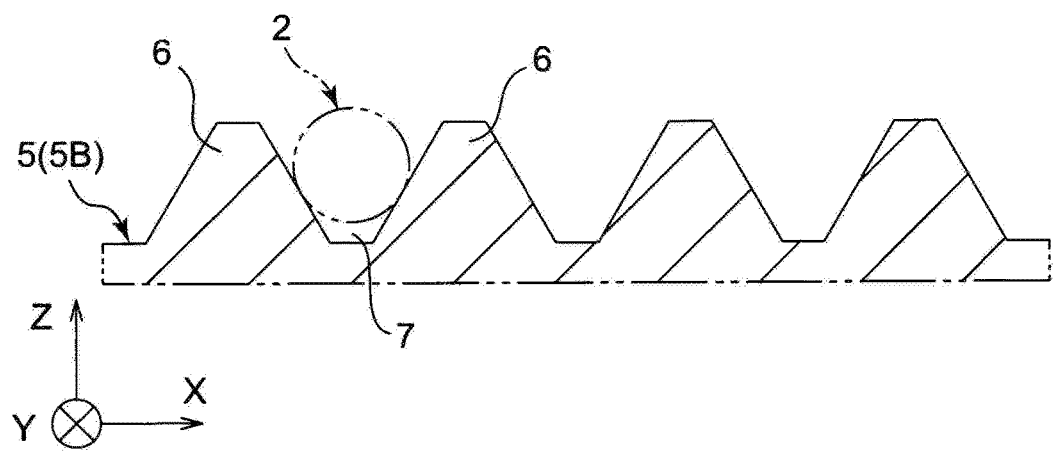
FIG. 19B is a schematic partially enlarged cross-sectional view of FIG. 18B.
Figure 19C:
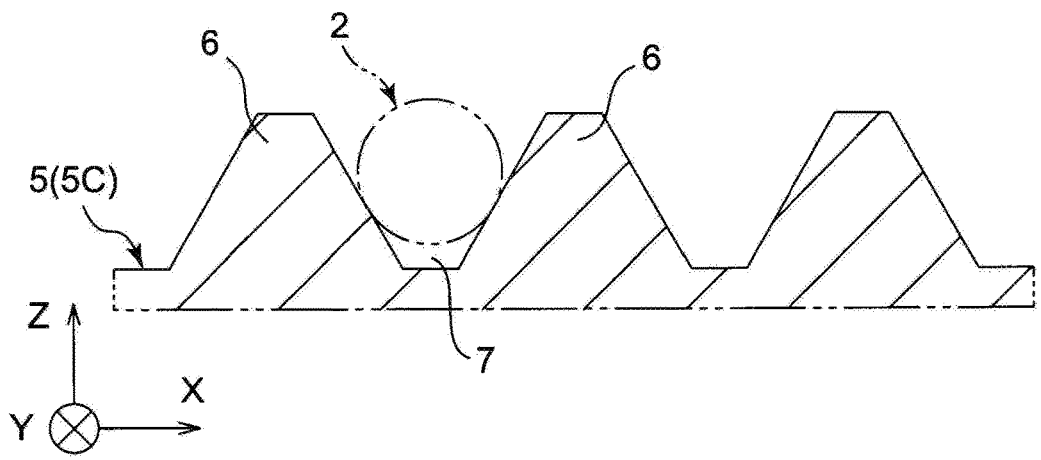
FIG. 19C is a schematic partially enlarged cross-sectional view of FIG. 18C.

Referring to FIGS. 1 to 3 together with FIGS. 16 and 17, the storing part 500 includes a linear motion guide 501 extending in the Z direction. Holding frames 502 for holding each of the storing trays 5 so that each of the storing trays 5 can be taken are provided on this linear motion guide 501 so that the holding frame 502 can be elevated. The holding frames 502 are arranged in multiple stages so as to overlap with each other in the Z direction. Linear motion guides 503, 503 extending in the Z direction are respectively placed on both sides of the storing trays 5 arranged in the multiple stages. Carriages 504, 504 respectively elevating on these linear motion guides 503, 503 are provided. Lifting members 505 which can be moved to a retracting position shown in FIG. 16 and a protruding position shown in FIG. 17 are respectively mounted on the carriages 504. Other lifting members 505 are also provided on the rear side in the drawings. Further, a plurality of lifting members 505 may be arranged in multiple stages.

In a state that the lifting members 505 are positioned at the retracting position as shown in FIG. 16, the carriages 504, 504 are moved to a position corresponding to one of the holding frames 502. Next, the lifting members 505 are moved to the protruding position as shown in FIG. 17 and inserted into a lower space of this holding frame 502. When the carriages 504, 504 are moved toward the upper side in this state, the holding frame 502 below which the lifting members 505 are inserted and the holding frames 502 provided above this holding frame 502 are lifted up. As a result, a gap S is formed between the holding frame 502 below which the lifting mechanisms 505 are inserted and the holding frame 502 provided just below this holding frame 502. This enables the suctioning nozzle 801 of the scalar type robot 800 to access the storing tray 5, which is held by the holding frame 502 provided just below the holding frame 502 below which the lifting members 505 are inserted, through this gap S. In other words, by forming this gap S, the suctioning nozzle 801 of the scalar type robot 800 can perform an operation for transferring and placing the returned medicine 2 and an operation for suctioning and holding the returned medicine 2 to take the returned medicine 2 with respect to all of the storing trays 5.

Referring to FIGS. 18A to 19C, the storing tray 5 contains a storing tray 5A (S-size) suitable for storing a relatively small size returned medicine 2, a storing tray 5B (M-size) suitable for storing a middle size returned medicine 2 and a storing tray 5C (L-size) suitable for storing a relatively large size returned medicine 2. The storing part 500 includes at least one of these three types storing trays 5A to 5C. Each of the storing trays 5 (5A to 5C) includes a tray main body 5a opening toward the upper side in the drawings and a flange portion 5b provided on an upper end of the tray main body 5a.

Referring to FIGS. 18A to 19C along with FIG. 20, a plurality of protruding portions (protrusions) 6 extending in the depth direction of the returned medicine supplying apparatus 1 (the Y direction) and arranged so as to be spaced apart from each other in the width direction of the returned medicine supplying apparatus 1 (the X direction) are formed on a bottom portion of the tray main body 5a. Linear arrangement grooves (concave portions) 7 are respectively formed between the adjacent protruding portions 6 and the returned medicines 2 are to be stored in the arrangement grooves 7. Since the three types storing trays 5A to 5C includes the protruding portions having different sizes (heights and widths), sizes (depths and widths) of the arrangement grooves 7 for the three types storing trays 5A to 5C are different from each other as is clear by referring to FIGS. 19A to 19C. Due to these differences of the sizes of the arrangement grooves 7, a size of the returned medicine 2 suitable for being stored differs for each type of the three types storing trays 5A to 5C as described above.

(Dispensing Part)

The dispensing part 600 includes a conveying mechanism 601. The conveying mechanism 601 transfers the dispensing tray 8 from an inlet port 602 schematically illustrated in FIG. 1 to a dispensing position (a position on the front side in the drawings for the storing part 500) to position the dispensing tray 8 and conveys the dispensing tray 8 after the dispensing operation has been completed from an outlet port 603 schematically illustrated in FIG. 1.

(Operations for Storing and Dispensing the Returned Medicine)

Description will be given to the operation for storing the returned medicine 2 whose identification by the identifying part 300 has completed into the storing part 500 and the operation for dispensing the returned medicine 2 from the storing part 500 to the dispensing tray arranged at the dispensing position in the dispensing part 600.

First, description will be given to the storing operation.

The returned medicine 2 in the label reading part 302 is suctioned and held by the suctioning nozzle 801 of the scalar type robot 800. With respect to the returned medicine 2 suctioned and held by the suctioning nozzle 801, a storing area is defined according to at least the size of the returned medicine 2. Namely, a storing position of the returned medicine 2 (a position in the storing tray 8 at which the returned medicine 2 is to be stored) and a range occupied by the returned medicine 2 when the returned medicine 2 is stored are defined with respect to the returned medicine 2 suctioned and held by the suctioning nozzle 801 according to at least the size of the returned medicine 2. In this embodiment, the range occupied by the returned medicine 2 when the returned medicine 2 is stored in the storing area corresponds to the length L1 and the width W of the returned medicine 2. A range occupied at the time of storing the returned medicine 2 contains a margin for preventing the returned medicine 2 from interfering with other returned medicines 2. The plurality of storing trays 5 of the storing part 500 are searched to find which storing tray 5 and which arrangement groove 7 of the storing tray 5 can be used to store and arrange the returned medicine 2 suctioned and held by the suctioning nozzle 801 therein. According to this searching result, one of the storing trays 5 and one of the arrangement grooves 7 (the storing position of the returned medicine 2) in which the returned medicine 2 is to be stored are decided. Focusing on the one of the storing trays 5, in the case where the "third" arrangement groove 7 has been already occupied by the other returned medicine 2 as shown in FIG. 20, the arrangement grooves 7 other than the third arrangement groove 7 become candidates for the storing position at which the returned medicine 2 suctioned by the suctioning nozzle 801 is to be stored. For example, in the case of focusing on the "sixth" groove, although two returned medicines 2 have been already arranged in the sixth groove, the sixth groove can be the candidate for arranging the returned medicine 2 suctioned and held by the suctioning nozzle 801 if a length between these two returned medicines 2 is equal to or longer than the above-described range occupied at the time of storing the returned medicine 2 for the returned medicine 2 being stored.

As described above, when the identification by the label reading part 302 completes, the returned medicine 2 takes the posture in which the label 3 is directed toward the upper side. The suctioning nozzle 801 of the scalar type robot 800 suctions and holds the returned medicine 2 with keeping the posture of the returned medicine 2 in which the label 3 is directed toward the upper side to transfer and place the returned medicine 2 into the appropriate arrangement groove 7 of the appropriate storing tray 5, that is into the storing area decided as described above.

As described with referring to FIGS. 16 and 17, the storing part 500 is configured to be capable of forming the gap S between the holding frames 502. Thus, the suctioning nozzle 801 of the scalar type robot 800 being suctioning and holding the returned medicine 2 can freely access the storing tray 5 held by any one of the holding frames 502 arranged in the multiple stages to place the suctioned and held returned medicine 2.

Further, as described with reference to FIGS. 18A to 19C, the storing tray 5 of the storing part 500 contains the three types storing trays 5A to 5C having the different sizes. Thus, the control device 1000 can control the identifying part 300, it is possible to store the returned medicine 2 whose identification has completed into the storing part 500 without the limitation on the size of the returned medicine 2 to be stored.

Regarding the returned medicines 2 stored in the storing part 500, the control device 1000 stores the described storing area for each of the returned medicines 2 in a state that the storing area for each of the returned medicines 2 is associated with the identification information of each of the returned medicines 2. Namely, the control device 1000 stores information on the storing trays 5 and the positions of the storing trays 5 (the arrangement grooves 7 and the positions on the arrangement grooves 7) at which the returned medicines 2 have been arranged in a state that the storing area for each of the returned medicines 2 is associated with the identification information of each of the returned medicines 2. Further, the control device 1000 stores the type and the expiration date of each of the returned medicines 2 in a state that the type and the expiration date of each of the returned medicines 2 are associated with the identification information of each of the returned medicines 2.

Next, description will be given to the dispensing operation.

The suctioning nozzle 801 of the scalar type robot 800 suctions and holds the returned medicine 2 from the storing tray 5 of the storing part 500 to transfer and place the returned medicine 2 onto the storing tray 5 arranged at the dispensing position.

The dispensing operation is performed based on the prescription data received by the returned medicine supplying apparatus 1 from the host system (HIS: Hospital Information System) which is the electronic health record system, for example. As described above, the type and the expiration date of each of the returned medicines 2 stored in the storing part 500 and the identification data of each of the returned medicines 2 are stored in a state that the type and the expiration date of each of the returned medicines 2 are associated with the identification data of each of the returned medicines 2, and the positions in the storing part 500 where each of the returned medicines 2 is stored are also stored in a state that the positions are associated with the identification data of each of the returned medicines 2. Specifically, the control device 1000 includes the medicine master storing the type, the expiration date and the storing area of each of the returned medicines 2 stored in the storing part 500 and the identification data of each of the returned medicine 2 in a state that the type, the expiration date and the storing area are associated with the identification data. In addition, since the gap S can be formed between the adjacent storing trays 5 arranged in the multiple stages as described above, the suctioning nozzle 801 can freely suction and hold even the returned medicine 2 stored in any one of the storing trays 5 arranged in the multiple stages as required. Thus, as a result of referring to the medicine master, if it is confirmed that the medicine contained in the prescription data is the returned medicine 2 stored in the storing part 500, it is possible to dispense the returned medicine 2 according to the prescription data without any limitations. Further, it is possible to efficiently dispense the returned medicine 2 according to the prescription data, that is, for example, it is possible to dispense one of the returned medicines 2 whose expiration date is earliest among the same type of the returned medicines 2. Furthermore, as a result of referring to the medicine master, if it is confirmed that the medicine contained in the prescription data is not stored in the storing part 500, it is possible to perform a process such as a process of allowing the display 1002 of the control panel 1001 to display necessary information.

As described above, according to the returned medicine supplying apparatus 1 of this embodiment, it is possible to automatically identify the returned medicines 2 having a variety of different characteristics such as the type, the shape, the size and the expiration date and supplied in the non-aligned state to store the returned medicines 2 with ensuring a high degree of freedom and freely dispense the returned medicines 2 according to the prescription data.

(Details for Identification of the Shape and the Size of the Medicine)

As described above, on the temporarily placing part 301 of the identifying part 300, the shape and the size of the returned medicine 2 are identified (information on the shape and the size is obtained). For this purpose, the returned medicine 2 is placed on a placing surface 305a of the semi-transparent plate 305 (a plane surface on the side of the camera 307) so that the longitudinal axis of the returned medicine 2 is parallel to the placing surface 305a as shown in FIGS. 1 and 12. Then, the returned medicine 2 placed on the semi-transparent plate 305 is photographed by the camera 307 provided on the upper side of the semi-transparent plate 305 in a state that the light is emitted from the lower side by the lighting part 306 arranged on the lower side of the semi-transparent plate 305.

The control device 1000 is configured to obtain the information on the shape and the size of the returned medicine 2 based on the image photographed by the camera 307. Namely, the control device 1000 serves as the identifying part for identifying the shape and the size of the returned medicine 2.

Further, the control device 1000 is configured to perform an image processing on the image of the camera 307 in which the returned medicine 2 is shown in order to obtain the information on the shape and the size of the returned medicine 2 (the control device 1000 includes an image processing part). For example, as the image processing performed on the image of the camera 307, an edge detecting process for detecting edges of a form of the returned medicine 2 shown in the image of the camera 307 and a binarization process for binarizing (black-and-white forming) the image of the camera 307 are performed. Based on an image subjected to the edge detecting process and an image subjected to the binarization process, the control device 1000 obtains the information on the shape and the size of the returned medicine 2.

Further, the control device 1000 is configured to determine whether or not the shape of the returned medicine 2 is a shape of the medicine to be treated by the returned medicine supplying apparatus 1 based on the obtained shape of the returned medicine 2.

For example, there is a case where the returned medicine 2 to be returned through the returned goods tray 4 contains a medicine having a shape engaging between the endless belt 308 and the roller 309 in the label reading part 302, a medicine having a shape which cannot be held by the scalar type robot 800 and a medicine having a shape which cannot be stored in the storing part 500, that is a medicine having a shape which cannot be treated by the returned medicine supplying apparatus 1 due to a structural reason thereof. As one example of such a medicine, a medicine in a state that the medicine is contained in a bag body or a box body, a medicine partially broken, a medicine whose label is partially peeled, a medicine whose partially peeled label adheres to another medicine and the like can be considered. Since the medicine as described above cannot be treated by the returned medicine supplying apparatus 1 due to the structural reason thereof, the medicine is treated as a medicine not to be treated (treated as a non-stored medicine). The non-stored medicine is returned to the returned goods tray 4 for the non-stored medicine through the non-stored medicine arrangement boxes 401, 402 of the non-stored medicine arrangement part 400.

(Details for Identification of the Type and the Expiration Date of the Medicine)

As described above, the type and the expiration date of the returned medicine 2 are identified by the label reading part 302 of the identifying part 300 (the information on the type and the expiration date is obtained). For this purpose, as shown in FIG. 13, the label reading part 302 includes the endless belt 308 on which the returned medicine 2 is to be placed and the roller 309 which makes contact with the returned medicine 2 placed on the endless belt 308 to rotate the returned medicine 2 around the axial line A of the returned medicine 2. The label reading part 302 further includes a belt driving part (not shown in the drawings) for driving the endless belt 308 and a roller driving part (not shown in the drawings) for driving the roller 309. Each of the belt driving part and the roller driving part is, for example, a motor and controlled by the control device 1000.

As shown in FIG. 13, the roller 309 is arranged on the upper side of the endless belt 308 through a space (for example, a space of 1 mm). Further, the travelling direction F of the endless belt 308 non-orthogonally crosses the extending direction of the rotational center line Rc of the roller 309 (the Y direction). For example, in this embodiment, an angle formed between the extending direction of the rotational center line Rc of the roller 309 and the travelling direction F of the endless belt 308 is in the range of 5 to 15 degrees.

The travelling direction F of the endless belt 308 is a direction in which the returned medicine 2 placed on the endless belt 308 approaches to the roller 309. On the other hand, a rotational direction of the roller 309 is a rotational direction whose rotational speed becomes reverse with respect to an X-direction component of the travelling direction F of the endless belt 308 in a facing area where the roller 309 faces the endless belt 308.

Further, in this embodiment, the endless belt 308 and the roller 309 are driven and controlled by the control device 1000 through the belt driving part and the roller driving part so that a movement speed of the endless belt 308 and the rotational speed of the roller 309 are equal to each other in the facing area between the endless belt 308 and the roller 309.

According to the endless belt 308 and the roller 309 as described above, the returned medicine 2 placed on the endless belt 308 is conveyed by the endless belt 308 and makes contact with the roller 309. With this configuration, the returned medicine 2 is kept in a state that the returned medicine 2 makes contact with the roller 309 and positioned in the X direction.

In this regard, the returned medicine 2 (in particular, the ampule 2A and the resin ampule 2C) is preferably placed on the endless belt 308 by the orthogonal type robot 700 in a state that the direction of the returned medicine 2 is directed so that the base end 2b of the returned medicine 2 faces the stopper 317 when the returned medicine 2 makes contact with the roller 309. If the ampule 2A or the resin ampule 2C is placed on the endless belt 308 in a state that the direction thereof is directed so that the tip end 2a (the head portion 2d) thereof is positioned on the side of the stopper 317, there is a possibility that a corner of the body portion 2c on the side of the base end 2b makes contact with the roller 309 in first when the conveying by the endless belt 308 is started and the direction of the ampule 2A or the resin ampule 2C is changed on the endless belt 308 by reaction of this contact, and thereby the head portion 2d thereof gets into a space between the endless belt 308 and the roller 309. Thus, in the case where there is the possibility that the head portion 2d of the returned medicine 2 gets into the space between the endless belt 308 and the roller 309, the returned medicine 2 is preferably placed on the endless belt 308 by the orthogonal type robot 700 in a state that the direction of the returned medicine 2 is directed so that the base end 2b thereof faces the stopper 317 when the returned medicine 2 makes contact with the roller 309.

Since the travelling direction F of the endless belt 308 and the extending direction of the rotational center line Rc of the roller 309 non-orthogonally cross each other, the returned medicine 2 which has contacted with the roller 309 is guided by the roller 309 and moved in the extending direction of the rotational center line Rc of the roller 309 (the Y direction). Finally, one end portion of the returned medicine 2 in the extending direction of the axial line A thereof makes contact with the stopper 317, and thereby the returned medicine 2 is positioned in the extending direction of the rotational center line Rc of the roller 309 (the Y direction). As a result, the returned medicine 2 is positioned with respect to the label reading part 302.

Due to the stopper 317 and the arrangement of the roller 309 with respect to the endless belt 308 in which the travelling direction F of the endless belt 308 and the extending direction of the rotational center line Rc of the roller 309 non-orthogonally cross each other, the returned medicine 2 is kept in a state that the returned medicine 2 is positioned with high accuracy.

If the travelling direction F of the endless belt 308 and the extending direction of the rotational center line Rc of the roller 309 orthogonally cross each other, there is a possibility that the returned medicine 2 which has contacted with the roller 309 is moved in the extending direction of the rotational center line Rc of the roller 309 and separated from the stopper 317. With taking account of this possibility, the travelling direction F of the endless belt 308 and the extending direction of the rotational center line Rc of the roller 309 non-orthogonally cross each other in order to keep this contacting state between the stopper 317 and the returned medicine 2.

Since the returned medicine 2 is kept in a state that the returned medicine 2 is positioned with the high accuracy, the returned medicine 2 can be kept in a field of view of the camera 311 of the label reading part 302 and the barcode of the label 3 of the returned medicine 2 can be kept in a state that the barcode is set in a readable area of the barcode reader 312, for example. As a result, it is possible to ensure high identification accuracy with respect to the type and the expiration date of the returned medicine 2 by the camera 311 and the barcode reader 312.

The control device 1000 is configured to obtain the information on the expiration date of the returned medicine 2 based on the image which is photographed by the camera 311 and in which the label 3 is shown (the control device 1000 includes an OCR part for identifying the expiration date written on the label 3). Further, the control device 1000 is configured to obtain the information on the type of the returned medicine 2 based on the barcode read by the barcode reader 312. Namely, the control device 1000 serves as a part of the identifying part 300 for identifying the type and the expiration date of the returned medicine 2.

As described above, in the case where the information on the type and the expiration date of the returned medicine 2 is contained in the barcode written on the label 3 (for example, in the case where the barcode indicating the expiration date is printed on the label 3), it is possible to obtain the information containing the type and the expiration date of the returned medicine 2 from the barcode read by the barcode reader 312. As a result, this makes it possible to omit the camera 311.

In this regard, since the type and the expiration date of the returned medicine 2 are identified from the label 3 of the returned medicine 2 in a state that the returned medicine 2 has been rotated by the roller 309 as described above, there is a possibility that the identification of the type and the expiration date fails. For responding to this problem, the identifying operation may be repeated until the number of the failures of the identification operation reaches a predetermined number of times or a predetermined time passes due to the repeat of the identifying operation (until the process time-outs), for example.

For example, in the case where the OCR part cannot identify the expiration date written on the label 3 shown in the image photographed by the camera 311, a new image is photographed by the camera 311. The OCR part performs the identifying operation on the expiration date of the label 3 shown in the newly photographed image. The OCR part performs the identification operation for the expiration date of the label 3 shown in this image newly photographed. In the case where the identifying operation fails the predetermined number of times (for example, the predetermined number of times is 18) or the process time-outs, the returned medicine 2 is treated as the non-stored medicine whose label 3 cannot be read (the returned medicine 2 is stored into the non-stored medicine arrangement boxes 401, 402 of the non-stored medicine arrangement part 400).

Further, the control device 1000 is configured to control the rotational speed of the roller 309 based on an outer diameter of the returned medicine 2 set on the label reading part 302.

The reason for this matter will be explained below. In the case where the outer diameter of the returned medicine 2 is relatively small and the rotational speed of the roller 309 is relatively high, a rotational speed of the returned medicine 2 is high. Thus, there is a possibility that the barcode reader 312 cannot accurately read the barcode of the label 3 adhering to an outer peripheral surface of the returned medicine 2. For responding to this problem, the control device 1000 controls the roller driving part so as to decrease the rotational speed of the roller 309 as the outer diameter of the returned medicine 2 reduces. In order to enable this control, the control device 1000 is configured to calculate the outer diameter of the returned medicine 2 based on the shape and the size (the size in the extending direction of the axial direction A) of the returned medicine 2 obtained from the image of the camera 307 of the temporarily placing part 301 of the identifying part 300.

(Decision of the Suctioning Position)

Next, description will be given to a method for calculating the suctioning position for the returned medicine 2 (the position where the returned medicine 2 is suctioned by the suctioning nozzle 701 of the orthogonal type robot 700 or the suctioning nozzle 801 of the scalar type robot 800) based on the image photographed by the camera 307 of the temporarily placing part 301 with reference to FIGS. 21 to 23.

Figure 21:
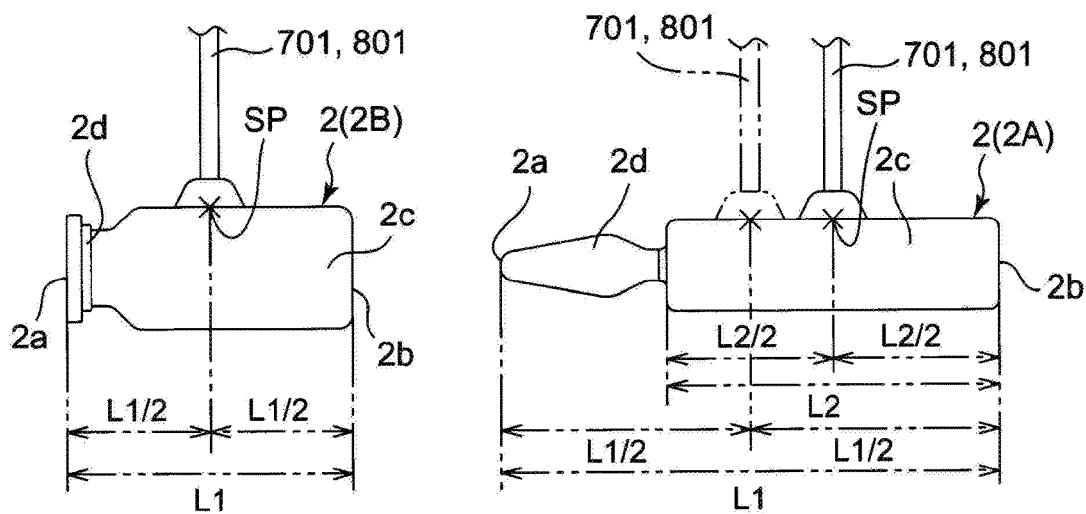
FIG. 21 is a schematic view showing a concept of a suctioning position.

Referring to FIG. 21, since the vial 2B has a relatively small protruding amount of the head portion 2d from the body portion 2c and a small difference between the diameters of the body portion 2c and the head portion 2d, a weight balance at the time of suctioning the vial 2B with the suctioning nozzle 701 or 801 is good when a substantially intermediate position of the length (total length L1) is set as a suctioning position SP. Namely, in the case of suctioning the vial 2B, by setting the substantially intermediate position of the total length L1 as the suctioning position SP, it is possible to stabilize the holding for the vial 2B by the suctioning nozzle 701 or 801.

Keeping referring to FIG. 21, since the ampule 2A has a relatively large protruding amount of the head portion 2d from the body portion 2c and a large difference between the diameters of the body portion 2c and the head portion 2d, a weight balance at the time of suctioning the ampule 2A with the suctioning nozzle 701 or 801 is not good when a substantially intermediate position of the length (total length L1) is set as the suctioning position SP. In the case of suctioning the ampule 2A, by setting not the substantially intermediate position of the total length L1 but a substantially intermediate position of a length L2 of the body portion 2c as the suctioning position SP, the weight balance at the time of suctioning the ampule 2A with the suctioning nozzle 701 or 801 becomes good. Namely, in the case of suctioning the ampule 2A, by setting the substantially intermediate position of the length L2 of the body portion 2c as the suctioning position SP, it is possible to stabilize the holding for the ampule 2A by the suctioning nozzle 701 or 801. This point can be applied to the case of suctioning the resin ampule 2C.

For the reasons stated above, the suctioning position SP for the returned medicine 2 is calculated based on the image photographed by the camera 307 of the temporarily placing part 301 according to the following procedures.

Figure 22:
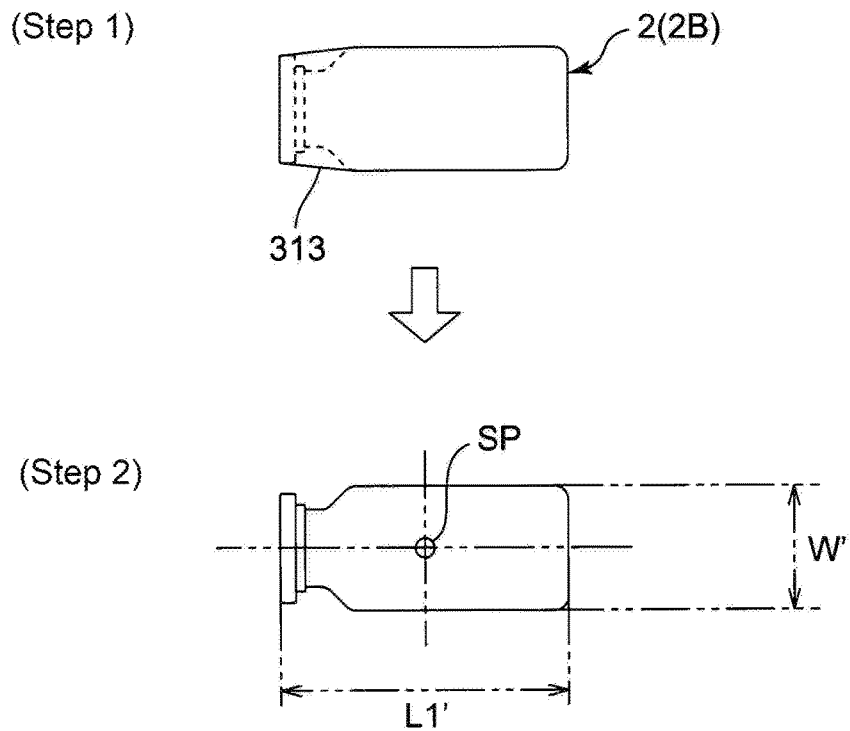
FIG. 22 is a schematic view showing a method for deciding the suctioning position in the case where a degree of convexity is low.
Figure 23:
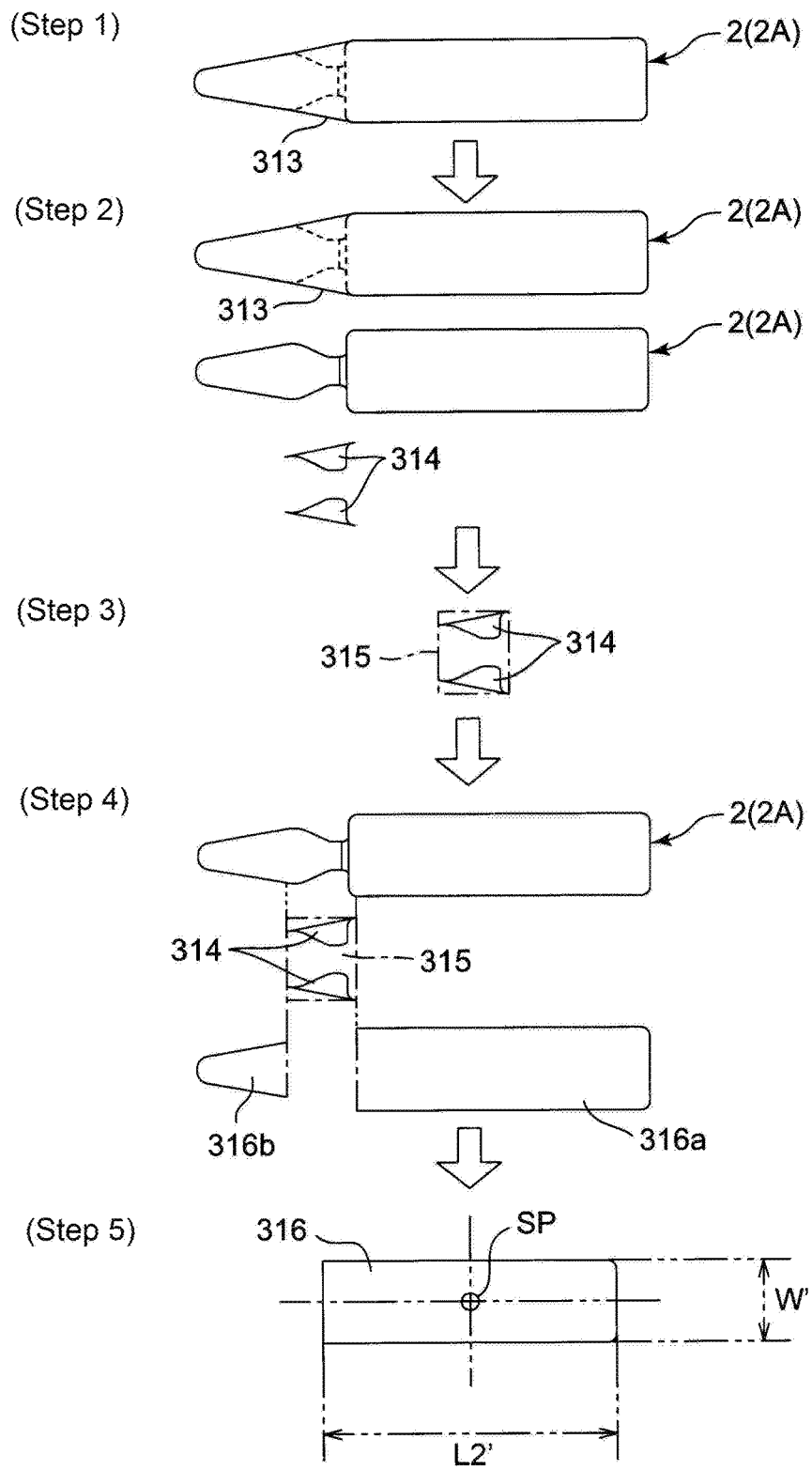
FIG. 23 is a schematic view showing a method for deciding the suctioning position in the case where the degree of convexity is high.

First, an envelope 313 with respect to an external profile shape of the image (the image of the returned medicine 2 in planar view) photographed by the camera 307 is defined (a step 1 in FIGS. 22 and 23). Further, a degree of convexity is calculated from this envelope 313 (the step 1 in FIGS. 22 and 23). A value of the degree of convexity approaches to 1 as a ratio of straight lines in the envelope 313 surrounding the returned medicine 2 increases. Namely, this means the fact that the difference between the diameters of the body portion 2c and the head portion 2d becomes small and a difference between the diameter of a neck portion of the body portion 2c connecting the body portion 2c and the head portion 2d and the diameter of the head portion 2d becomes small as the value of the degree of convexity (an maximum value thereof is 1) increases.

If the calculated value of the degree of convexity is equal to or more than a predetermined threshold value (for example, the threshold value can be set to be in the range of 0.8 to 0.9), it is possible to determines that the returned medicine 2 photographed by the camera 307 has a shape which can be estimated to be the vial 2B. Thus, a position located at an intermediate position of the total length L1 and an intermediate position of the width W is set as the suctioning position SP (a step 2 in FIG. 22).

If the calculated value of the degree of convexity is less than the predetermined threshold value described above, it is possible to determine that the returned medicine 2 photographed by the camera 307 has a shape which can be estimated to be the ampule 2A (or the resin ampule 2C), the following process is performed for setting an intermediate positon of the length L2 of the body portion 2c as the suctioning point SP.

First, the envelope 313 is compared with the external profile shape of the image of the returned medicine 2 to extract a waist portion 314 corresponding to the neck portion (a portion whose diameter partially reduces) between the body portion 2c and the head portion 2d (a step 2 in FIG. 23).

Next, a rectangular area 315 surrounding the extracted waist portion 314 with straight lines is created (a step 3 in FIG. 23).

After that, two areas 316a, 316b are created by removing the rectangular area 315 from the external profile shape of the image of the returned medicine 2 (a step 4 in FIG. 23). These areas 316a, 316b correspond to areas other than the waist portion 314 of the external profile shape of the image of the returned medicine 2. Further, one of these areas 316a, 316b corresponds to the body portion 2c of the returned medicine 2 and the other of these areas 316a, 316b corresponds to the head portion 2d of the returned medicine 2. Square measures of the areas 316a, 316b are compared with each other to remain one whose square measure is larger (corresponding to the body portion 2c) as a target to be processed and remove the other whose square measure is smaller (corresponding to the head portion 2d) from the target to be processed. In this example, since the square measure of the area 316a is larger than the square measure of the area 316b, the area 316a remains as the target to be processed.

Finally, a position located at an intermediate position of a length L2' of the area 316a (corresponding to the length L2 of the body portion 2c of the ampule 2A) and an intermediate position of a width W' (corresponding to the width W of the body portion 2c of the ampule 2A) is set as the suctioning position SP (a step 5 in FIG. 23).

According to the described procedures, it is possible to automatically decide the suctioning position SP at which the returned medicine 2 can be stably held by the suctioning nozzle 701 or 801 based on the image photographed by the camera 307 of the temporarily placing part 301.

(Process From the Identification of the Shape of the Returned Medicine to the Conveying of the Returned Medicine)

Figure 24A:
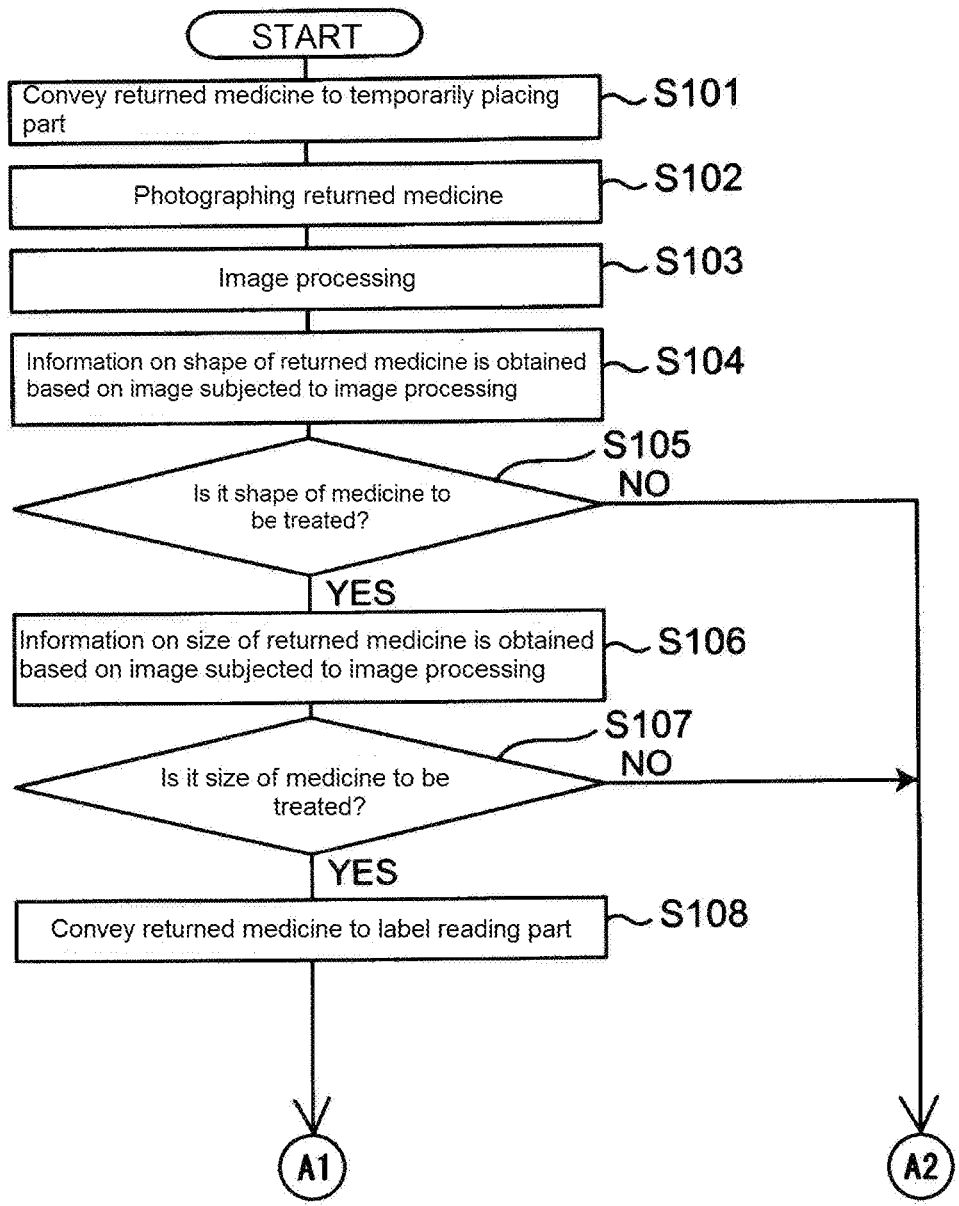
FIG. 24A is a flow chart for arranging the returned medicine from a temporarily placing part of the identifying part to the storing part or the non-stored medicine arrangement part.
Figure 24B:
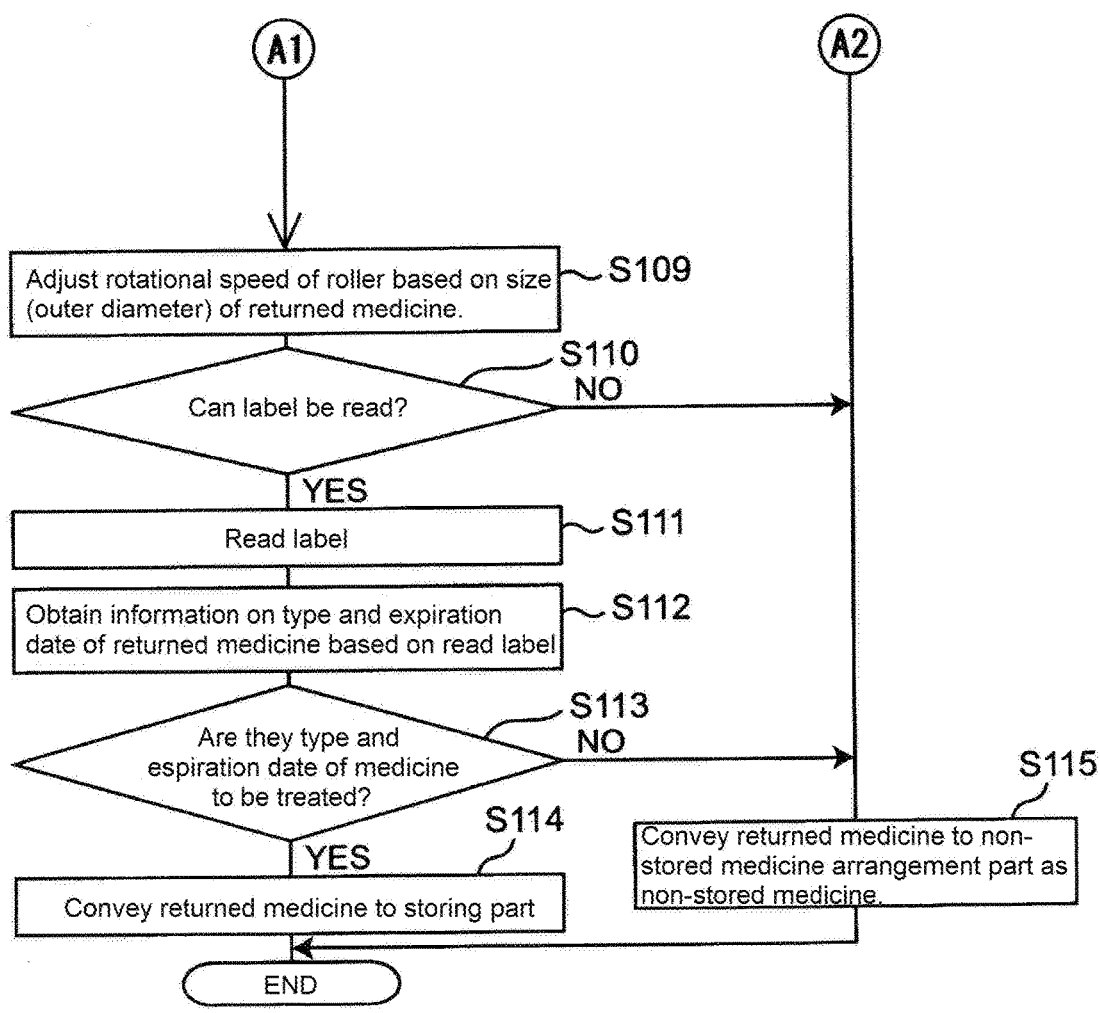
FIG. 24B is another flow chart for arranging the returned medicine from the temporarily placing part of the identifying part to the storing part or the non-stored medicine arrangement part.

Next, description will be given to one example of the described flow from the identification of the shape and the like of the returned medicine 2 to the conveying of the returned medicine 2 based on the identifying result with reference to FIGS. 24A and 24B.

First, at a step S101, the returned medicine 2 is placed onto the semi-transparent plate 305 in the temporarily placing part 301 of the identifying part 300 by the orthogonal type robot 700.

Next, at a step S102, the returned medicine 2 placed on the semi-transparent plate 305 is photographed by the camera 307 arranged on the upper side of the returned medicine 2.

At a step S103, the image of the camera 307 photographed at the step S102 is subjected to the image processing (the edge detecting process and the binarization process) by the control device 1000.

At a step S104, the control device 1000 obtains the information on the shape of the returned medicine 2 placed on the semi-transparent plate 305 of the temporarily placing part 301 based on the image of the camera 307 subjected to the image processing at the step S103.

At a step S105, the control device 1000 determines whether or not the shape of the returned medicine 2 placed on the semi-transparent plate 305 of the temporarily placing part 301 is the shape of the medicine to be treated based on the information on the shape of the returned medicine 2 obtained at the step S104. In the case where the shape of the returned medicine 2 is the shape of the medicine to be treated, the process shifts to a step S106. In the case where the shape of the returned medicine 2 is not the shape of the medicine to be treated (in the case where the shape of the returned medicine 2 is the shape of the medicine not to be treated), the process shifts to a step S115.

At the step S106, the control device 1000 obtains the information on the size of the returned medicine 2 placed on the semi-transparent plate 305 of the temporarily placing part 301 based on the image of the camera 307 subjected to the image processing at the step S103.

At a step S107, the control device 1000 determines whether or not the size of the returned medicine 2 placed on the semi-transparent plate 305 of the temporarily placing part 301 is the size of the medicine to be treated based on the information on the size of the returned medicine 2 obtained at the step S106. In the case where the size of the returned medicine 2 is the size of the medicine to be treated, the process shifts to a step S108. In the case where the size of the returned medicine 2 is not the size of the medicine to be treated (in the case where the size of the returned medicine 2 is the size of the medicine not to be treated), the process shifts to the step S115.

At the step S108, the returned medicine 2 on the temporarily placing part 301 is conveyed to the label reading part 302 by the orthogonal type robot 700. Due to this conveying, the returned medicine 2 is set in the label reading part 302.

At a step S109, the control device 1000 adjusts the rotational speed of the roller 309 of the label reading part 302 which makes contact with the returned medicine 2 to rotate the returned medicine 2 based on the size (the outer diameter) of the returned medicine 2 obtained at the step S106.

At a step S110, the control device 1000 determines whether or not the label 3 of the returned medicine 2 can be accurately read by the camera 311 or the barcode reader 312.

In the case where the expiration date or the barcode indicating the type of the returned medicine 2 which are written on the label 3 can be accurately read, the process shifts to a step S111. In the case where the expiration date or the barcode cannot be accurately read, for example, in the case where the expiration date or the barcode is partially effaced, the process shifts to the step S115.

At the step S111, the label 3 of the returned medicine 2 is accurately read by the camera 311 or the barcode reader 312 in the label reading part 302.

At a step S112, the control device 1000 obtains the information on the type and the expiration date of the returned medicine 2 based on the label 3 of the returned medicine 2 read at the step S111.

At a step S113, the control device 1000 determines whether or not the type and the expiration date of the returned medicine 2 set in the label reading part 302 are the type and the expiration date of the medicine to be treated based on the information on the type and the expiration date of the returned medicine 2 obtained at the step S112. Namely, the control device 1000 determines whether or not the type of the returned medicine 2 is the type stored in the medicine master and determines whether or not the expiration date has not expired or a sufficient time remains by the expiration date. In the case where both of the type and the expiration date are the type and the expiration date of the medicine to be treated, the process shifts to a step S114. In the case where at least one of the type and the expiration date is not the type or the expiration date of the medicine to be treated, the process shifts to the step S115.

At the step S114, the returned medicine 2 in the label reading part 302 is conveyed to the storing part 500 by the scalar type robot 800 as the medicine to be treated. Namely, the returned medicine 2 whose shape, size, type and expiration date are the shape, the size, the type and the expiration date of the medicine to be treated is stored in the storing part 500.

At the step S115, the returned medicine 2 whose shape is determined to be the shape of the medicine not to be treated at the step S105, the returned medicine 2 whose size is determined to be the size of the medicine not to be treated at the step S107, the returned medicine 2 whose label 3 is determined that the label 3 cannot be read at the step S110 or the returned medicine 2 whose at least one of the type and the expiration date is the type or the expiration date of the medicine not to be treated at the step S113 is conveyed (stored) in the non-stored medicine arrangement part 400 as the non-stored medicine.

(Modified Example)

Hereinafter, description will be given to a variety of modified examples of the embodiment described above.

In the described embodiments, in the case where the returned medicine 2 is the medicine to be treated, the returned medicine 2 is stored from the returned goods tray 4 into the storing tray 5 of the storing part 500 through the temporarily placing part 301 of the identifying part 300 and the label reading part 302 in this order. Alternatively, the returned medicine 2 may be stored into the storing part 500 through the label reading part 302 without passing through the temporarily placing part 301.

Specifically, the temporarily placing part 301 is provided with assuming a case where the shape and the size of the returned medicine 2 returned through the returned goods tray 4 are the shape and the size of the medicine which cannot be treated by the returned medicine supplying apparatus 1.

However, in the case where most of the returned medicines 2 (which are directly stored into the apparatus of the present invention from a box delivered from a user, a medicine manufacturer or the like to which information and precautions are completely informed immediately after the box has been opened and which are returned to the apparatus of the present invention through the returned goods tray 4) are treated as the medicine to be treated by the returned medicine supplying apparatus 1, it is a significant waste of time to subject all of such returned medicines 2 to the identification of the shape and the size on the temporarily placing part 301.

For responding to this matter, the returned medicine 2 in the returned goods tray 4 is first transferred and placed to the label reading part 302 of the identifying part 300 (the returned medicine 2 is placed on the endless belt 308 of the label reading part 302) by the orthogonal type robot 700. Next, the returned medicine 2 on the endless belt 308 is photographed by the camera 311 before the endless belt 308 and the roller 309 are driven. Based on this photographed image, the direction of the returned medicine 2 on the endless belt 308 is identified. Then, it is determined whether or not this identified direction is directed so that the base end 2b of the returned medicine 2 is positioned on the side of the stopper 317. In the case where the direction is not directed as described above, the direction is changed by the orthogonal type robot 700.

In this regard, it is also possible to identify the direction of the returned medicine 2 based on the image photographed by the camera 304 arranged on the upper side of the returned goods tray 4 if the returned medicine 2 exists in the returned goods tray 4, that is if the returned goods tray 4 is placed on the table 203 of the elevating part 200. The direction of the returned medicine 2 in the returned goods tray 4 is identified based on the image of the camera 304 and then the orthogonal type robot 700 places the returned medicine 2 on the endless belt 308 of the label reading part 302 based on this identifying result so that the base end 2b of the returned medicine 2 is position on the side of the stopper 317.

The type and the expiration date of the returned medicine 2 transferred to the label reading part 302 from the returned goods tray 4 are identified by the camera 311 and the barcode reader 312.

Based on the identified type, the information on the shape and the size of the returned medicine 2 is obtained. Specifically, the control device 1000 includes a size information master for storing the type, the shape and the size of the returned medicine 2 in a state that the type, the shape and the size are associated with each other. By referring to the information stored in this size information master, the control device 1000 can obtain the shape and the size corresponding to the type of the returned medicine 2 identified by the label reading part 302. Then, based on the obtained shape and the obtained size, the storing area for the returned medicine 2 is defined in the storing part 500.

In the case where the information on the shape and the size corresponding to the type identified by the label reading part 302 does not exist in the size information master, the returned medicine 2 in the label reading part 302 is transferred to the temporarily placing part 301 in order to obtain the information on the shape and the size of the returned medicine 2. Then, the information on the shape and the size of the returned medicine 2 is obtained on the temporarily placing part 301 as described above. The obtained information on the shape and the size of the returned medicine 2 is stored in the size information master in a state that the information on the shape and the size of the returned medicine 2 is associated with the type of the returned medicine 2. Further, based on the shape and the size of the returned medicine 2, the storing area for the returned medicine 2 is defined in the storing part 500.

In this regard, it may be possible to update association information for the type, the shape and the size of the returned medicine 2 stored in the size information master or add new association information for a type, a shape and a size of a new returned medicine 2 through a network environment or the like. For example, based on information on a medicine supplied from a supplier, it may be possible to add association information for a type, a shape and a size of this new returned medicine 2 into the size information master through a PC (personal computer) connected to a network environment. With this configuration, it becomes unnecessary to transfer the returned medicine 2 from the label reading part 302 to the temporarily placing part 301 to obtain the information on the shape and the size of the returned medicine 2 on the temporarily placing part 301 or necessity of this operation becomes low.

Figure 25:
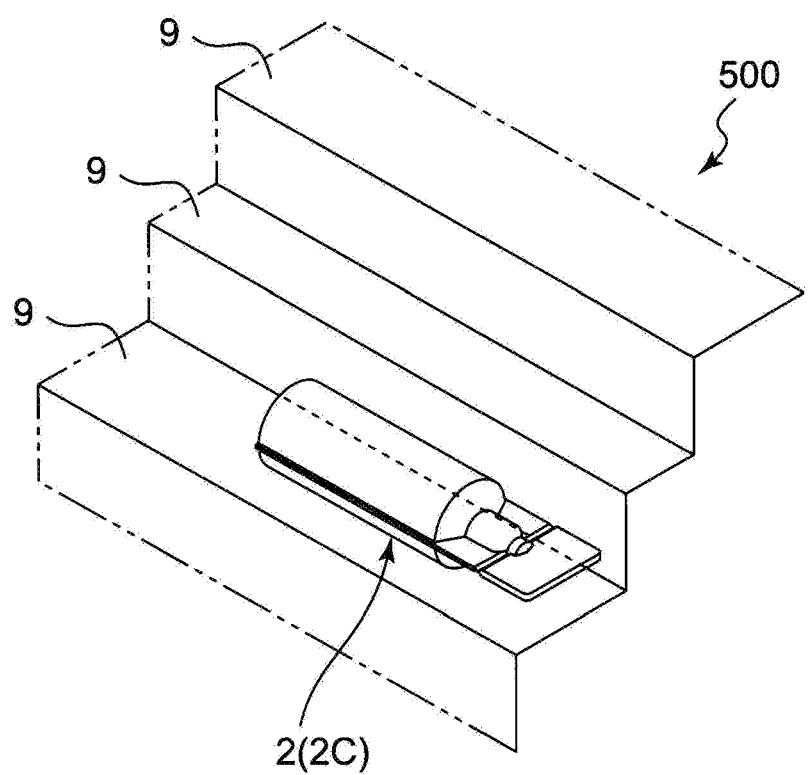
FIG. 25 is a schematic partial perspective view of an alternative of the storing part.

The storing tray is not limited to these of the described embodiments. For example, it may be possible to arrange a member which can be deformed when the returned medicine 2 is arranged on the bottom portion of the tray main body 5a of the storing tray 5 so as to keep the direction and the posture of the arranged returned medicine 2. Namely, the storing tray 5 may be a member which can planarly store the returned medicine 2 so as to keep the direction and the posture of the returned medicine 2 in a different manner differing from these of the described embodiments. Further, the storing part 500 may include a plurality of step portions 9 each on which the returned medicine 2 can be arranged as shown in FIG. 25.

In the described embodiments, the orthogonal type robot 700 and the scalar type robot 800 hold the returned medicine 2 by using the suctioning nozzles 701, 801. However, these robots may releasably hold the returned medicine 2 by using not the suctioning but a mechanical manner.

Although the present invention is described by exemplifying the returned medicine supplying apparatus, the present invention is not limited to the medicine supplying apparatus for treating the returned medicine. Namely, the medicine supplied from the receiving part is not limited to the returned medicine.

What is claimed is:
1. A medicine sorting apparatus, comprising:
    a receiving part for receiving medicines which are in a state that directions or postures of the medicines are different and characteristics of the medicines are different;
    a first transferring part for individually transferring the medicines from the receiving part to the identifying part;
    an identifying part for identifying a direction, a posture and characteristics of each medicine wherein the characteristics of each medicine include at least one of a shape, a size, a type and an expiration date of medicines having transferred by the first transferring part;
    a storing part for storing and sorting the medicines which have transferred by a second transferring part, so that each of the medicines can be taken from the storing part;
    the second transferring part for individually transferring the medicines from the identifying part to the storing part;

a dispensing mechanism for individually dispensing the medicines having taken from the storing part to a dispensing container;

wherein a storing area is defined for each of the medicines in the storing part according to, at least in part, the size of each of the medicines identified by the identifying part, and each of the medicines are arranged, at the time of storing the medicines in the storing part, in a state that the storing area is associated with identification information of each of the medicines.

2. The medicine sorting apparatus according to claim 1, wherein the second transferring part serves as the dispensing mechanism.

3. The medicine sorting apparatus according to claim 1, wherein the second transferring part includes a barcode reader.

4. A medicine sorting apparatus, comprising:

an identifying part for identifying a direction, a posture and characteristics of each medicine wherein the characteristics of each medicine include at least one of a shape, a size, a type and an expiration date of medicines; and a storing part for storing and sorting the medicines so that each of the medicines can be taken from the storing part, wherein a storing area is defined for each of the medicines in the storing part according to, at least in part, the size of each of the medicines identified by the identifying part, and each of the medicines are arranged, at the time of storing the medicines in the storing part, in a state that the storing area is associated with identification information of each of the medicines, wherein the storing part stores the medicines so that gaps are formed between the medicines arranged adjacently to each other.

5. The medicine sorting apparatus according to claim 4, wherein the storing part has at least one storing container in which the medicines are to be planarly stored so that the direction and the posture of each of the medicines are kept.

6. The medicine sorting apparatus according to claim 5, wherein the storing container includes a plurality of protrusions and a plurality of concave portions formed between the adjacent protrusions, and wherein the plurality of medicines can be arranged in each of the concave portions so that the plurality of medicines are arranged in an extending direction of each of the concave portions.

7. The medicine sorting apparatus according to claim 5, wherein the storing container includes a plurality of storing containers, wherein the plurality of storing containers are arranged in multiple stages in the storing part, and wherein the storing part includes a mechanism for providing a gap between one of the storing containers arranged in the multiple stages and the other one of the storing containers provided immediately above the one of the storing containers.

8. The medicine sorting apparatus according to claim 5, wherein the storing part includes plural types of storing containers, and wherein a size of the medicine suitable for being stored differs for each type of the storing containers.

9. A medicine sorting apparatus, comprising:

an identifying part for identifying a direction, a posture and characteristics of each medicine wherein the characteristics of each medicine include at least one of a shape, a size, a type and an expiration date of medicines; and a storing part for storing and sorting the medicines so that each of the medicines can be taken from the storing part, wherein a storing area is defined for each of the medicines in the storing part according to, at least in part, the size of each of the medicines identified by the identifying part, and each of the medicines are arranged, at the time of storing the medicines in the storing part, in a state that the storing area is associated with identification information of each of the medicines, wherein the identifying part includes:

a first identifying part for identifying the shape, the size and the direction of each of the medicines, wherein the first identifying part further includes a second photographing unit for identifying the size of each of the medicines; and a second identifying part to which each of the medicines whose direction is adjusted based, at least in part, on an identifying result of the first identifying part is transferred, said second identifying part identifies indicated information which contains the type and the expiration date indicated on each of the transferred medicines.

10. The medicine sorting apparatus according to claim 9, wherein the first identifying part includes a first photographing unit for identifying a position of each of the medicines and a substantially intermediate position of each of the medicines in a longitudinal direction thereof.

11. The medicine sorting apparatus according to claim 9, wherein the second photographing unit captures photographs for identifying the shape of each of the medicines.

12. The medicine sorting apparatus according to claim 11, wherein the second photographing unit captures photographs to identify a position at which each of the medicines is to be held at the time of transferring the medicines.

13. The medicine sorting apparatus according to claim 12, wherein the second identifying part includes a third photographing unit for identifying the indicated information of each of the medicines.

14. The medicine sorting apparatus according to claim 13, wherein the second identifying part includes a first barcode reader.

15. The medicine sorting apparatus according to claim 9, wherein the storing part stores each of the medicines in a posture that the indicated information is directed toward the upper side.

16. A medicine sorting method, comprising:

causing a receiving part to take in and hold at least one receiving container that contains the medicines which are in a state that the directions or the postures are different and the characteristics are different;

causing a first transferring part to individually transfer the medicines being taken from the receiving part to the identifying part;

identifying a direction, a posture and characteristics of each medicine wherein the characteristics of each medicine include at least one of a shape, a size, a type and an expiration date of medicines with an identifying part;

defining a storing area for each of the medicines in a storing part according to at least the size thereof identified by the identifying part;

causing a second transferring part to individually transfer the medicines from the identifying part to the storing part in such a manner as to arrange each of the medicines in a state that the storing area defined for each of the medicines in the storing part is associated with identification information of each of the medicines; and
causing a dispensing mechanism to individually dispense the medicines having taken from the storing part to a dispensing container.

\* \* \* \* \*